United States Patent
Jin et al.

(10) Patent No.: US 10,511,956 B2
(45) Date of Patent: Dec. 17, 2019

(54) DEVICE ASSOCIATION METHOD AND RELATED DEVICE

(71) Applicant: Huawei Technologies Co., Ltd., Shenzhen (CN)

(72) Inventors: Hui Jin, Beijing (CN); Jian Wang, Beijing (CN); Da Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/755,070

(22) PCT Filed: Aug. 24, 2015

(86) PCT No.: PCT/CN2015/087895
§ 371 (c)(1),
(2) Date: Feb. 24, 2018

(87) PCT Pub. No.: WO2017/031661
PCT Pub. Date: Mar. 2, 2017

(65) Prior Publication Data
US 2018/0249319 A1 Aug. 30, 2018

(51) Int. Cl.
*H04W 8/08* (2009.01)
*H04W 12/08* (2009.01)
(Continued)

(52) U.S. Cl.
CPC ............ *H04W 8/08* (2013.01); *H04W 12/04* (2013.01); *H04W 12/08* (2013.01); *H04W 48/14* (2013.01);
(Continued)

(58) Field of Classification Search
CPC ....... H04W 8/08; H04W 76/14; H04W 12/04; H04W 12/08; H04W 48/14;
(Continued)

(56) References Cited

U.S. PATENT DOCUMENTS 6,614,774 B1 * 9/2003 Wang ............... H04L 29/12066
370/338
2014/0079022 A1 3/2014 Wang et al.
(Continued)

FOREIGN PATENT DOCUMENTS

| CN | 101926122 B | 8/2012 |
| CN | 103501494 A | 1/2014 |

(Continued)

OTHER PUBLICATIONS

"Mobility management for interworking between WiMAX and UMTS," Series Y: Global Information Infrastructure, Internet Protocol Aspects and Next-Generation Networks, ITU-T Y.2812, XP017577991, Jul. 29, 2012, 36 pages.

*Primary Examiner* — Chandrahas B Patel
(74) *Attorney, Agent, or Firm* — Slater Matsil, LLP

(57) ABSTRACT

A method includes receiving, by a core network entity, a first message from a first terminal. When the core network entity determines, according to the first message, that the first terminal is allowed to associate with a second terminal, a second message is generated by the core network entity and sent to the first terminal, where the second message is used to establish an association between the first terminal and the second terminal.

20 Claims, 18 Drawing Sheets

(51) Int. Cl.
- *H04W 52/02* (2009.01)
- *H04W 48/14* (2009.01)
- *H04W 76/14* (2018.01)
- *H04W 12/04* (2009.01)
- *H04W 88/04* (2009.01)

(52) U.S. Cl.
CPC ... *H04W 52/0216* (2013.01); *H04W 52/0219* (2013.01); *H04W 76/14* (2018.02); *H04W 52/0209* (2013.01); *H04W 88/04* (2013.01); *Y02D 70/00* (2018.01); *Y02D 70/10* (2018.01); *Y02D 70/12* (2018.01); *Y02D 70/122* (2018.01); *Y02D 70/126* (2018.01); *Y02D 70/1224* (2018.01); *Y02D 70/20* (2018.01); *Y02D 70/26* (2018.01)

(58) Field of Classification Search
CPC ......... H04W 52/0216; H04W 52/0219; H04W 52/0209; H04W 88/04; Y02D 70/20; Y02D 70/26; Y02D 70/1224; Y02D 70/00; Y02D 70/12; Y02D 70/122; Y02D 70/126; Y02D 70/10
See application file for complete search history.

(56) References Cited

U.S. PATENT DOCUMENTS

| | | |
|---|---|---|
| 2014/0106677 A1 | 4/2014 | Altman |
| 2014/0259136 A1 | 9/2014 | Levy et al. |
| 2016/0095022 A1 | 3/2016 | Jin et al. |
| 2017/0374611 A1 | 12/2017 | Pragada et al. |

FOREIGN PATENT DOCUMENTS

| | | |
|---|---|---|
| CN | 104244442 A | 12/2014 |
| CN | 104272707 A | 1/2015 |
| CN | 104618891 A | 5/2015 |
| CN | 104852771 A | 8/2015 |
| WO | 2014113630 A1 | 7/2014 |
| WO | 2015035621 A1 | 3/2015 |
| WO | 2015120625 A1 | 8/2015 |

\* cited by examiner

1

DEVICE ASSOCIATION METHOD AND RELATED DEVICE

CROSS-REFERENCE TO RELATED APPLICATIONS

This application is a National Stage of International Application No. PCT/CN2015/087895, filed on Aug. 24, 2015, which is hereby incorporated by reference in its entirety.

TECHNICAL FIELD

The present invention relates to the field of communications technologies, and in particular, to a device association method and a related device.

BACKGROUND

Currently, the prior art provides a wearable device. For example, the wearable device may be a watch in which a SIM (Subscriber Identity Module) card is installed, so that the wearable device can directly connect to a network to implement data transmission.

However, a limited volume of the wearable device results in a limited battery capacity of the wearable device. Therefore, the battery capacity of the wearable device is small. If the wearable device directly communicates with the network, the battery is exhausted quickly, and further, a standby time of the wearable device is shortened, and a user requirement on power of the wearable device cannot be satisfied. In addition, to enable the user to wear the wearable device, the wearable device is generally in a special shape, and this makes it difficult to design an antenna. Currently, only a single antenna can be implemented in the wearable device. Therefore, when sending a same amount of data, in comparison with a multi-antenna device, the single-antenna wearable device needs to spend a longer time, and consume a large quantity of network resources.

SUMMARY

The present invention provides a device association method and a related device to effectively reduce power consumption of a first terminal and effectively improve efficiency of data transmission between the first terminal and a core network entity.

According to a first aspect of the present invention, a device association method is provided and includes receiving, by a core network entity, a first message. When the core network entity determines, according to the first message, that a first terminal is allowed to associate with a second terminal, the method further includes generating, by the core network entity, a second message, where the second message is used to establish an association between the first terminal and the second terminal, so that the first terminal can connect to a network by using the second terminal.

With reference to the first aspect of the present invention, in a first implementation of the first aspect of the present invention, the receiving, by a core network entity, a first message includes receiving, by the core network entity, the first message sent by the first terminal, where the first message includes a first list, the first list includes an identity of one or more target second terminals monitored by the first terminal, and the target second terminal is a terminal that is monitored by the first terminal and whose signal strength is greater than a preset value. After the receiving, by a core network entity, a first message, the method further includes determining, by the core network entity according to the first list, the second terminal allowed to associate with the first terminal.

With reference to the first implementation of the first aspect of the present invention, in a second implementation of the first aspect of the present invention, the determining, by the core network entity according to the first list, the second terminal allowed to associate with the first terminal includes, if the core network entity determines that an intersection exists between the first list and a second list, selecting, by the core network entity, the second terminal from the intersection, where the core network entity includes the second list, and the second list includes an identity of one or more second terminals allowed to associate with the first terminal.

With reference to the second implementation of the first aspect of the present invention, in a third implementation of the first aspect of the present invention, the selecting, by the core network entity, the second terminal from the intersection includes selecting, by the core network entity, a target second terminal having greatest signal strength from the intersection as the second terminal, where the first list includes the identity of the one or more target second terminals and corresponding signal strength of each target second terminal.

With reference to the first implementation of the first aspect of the present invention, in a fourth implementation of the first aspect of the present invention, the first list includes the identity of the one or more target second terminals and corresponding signal strength of each target second terminal, and the determining, by the core network entity according to the first list, the second terminal allowed to associate with the first terminal includes selecting, by the core network entity, a target second terminal having greatest signal strength from the first list as the second terminal. Determining the second terminal further includes sending, by the core network entity, a third message to the second terminal, where the third message is used to request the second terminal to determine whether the first terminal is allowed to associate with the second terminal. Determining the second terminal also includes receiving, by the core network entity, a fourth message returned by the second terminal, where the fourth message includes a determining result of the second terminal, and determining, by the core network entity according to the determining result, whether the first terminal is allowed to associate with the second terminal.

With reference to the method in any one of the first implementation of the first aspect of the present invention to the fourth implementation of the first aspect of the present invention, in a fifth implementation of the first aspect of the present invention, after the generating, by the core network entity, a second message, the method further includes sending, by the core network entity, the second message to the first terminal, where the second message includes an identity of the second terminal. The method also includes sending, by the core network entity, a fifth message to the second terminal, where the fifth message includes an identity of the first terminal, so that the first terminal and the second terminal establish the association according to the second message and the fifth message.

With reference to the method in any one of the first implementation of the first aspect of the present invention to the fourth implementation of the first aspect of the present invention, in a sixth implementation of the first aspect of the present invention, after the generating, by the core network entity, a second message, the method further includes sending, by the core network entity, the second message to the first terminal, where the second message includes an identity of the second terminal and a target key. The method also includes sending, by the core network entity, a fifth message to the second terminal, where the fifth message includes an identity of the first terminal and the target key, and the target key is a key on an air interface of a direct channel between the first terminal and the second terminal, so that the first terminal and the second terminal establish the association according to the second message and the fifth message.

With reference to the first aspect of the present invention, in a seventh implementation of the first aspect of the present invention, the receiving, by a core network entity, a first message includes receiving, by the core network entity, the first message sent by the second terminal, where the first message includes an identity of the first terminal. The generating, by the core network entity, a second message includes, if the core network entity determines that the identity of the first terminal included in the first message satisfies a preset requirement, determining, by the core network entity, that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the first aspect of the present invention, in an eighth implementation of the first aspect of the present invention, the receiving, by a core network entity, a first message includes receiving, by the core network entity, the first message sent by the second terminal, where the first message includes an identity of the first terminal. The generating, by the core network entity, a second message includes sending, by the core network entity, a third message to the second terminal, where the third message is used to request the second terminal to determine whether the first terminal is allowed to associate with the second terminal. The generating also includes receiving, by the core network entity, a fourth message returned by the second terminal, where the fourth message includes a determining result of the second terminal, and determining, by the core network entity according to the determining result, whether the first terminal is allowed to associate with the second terminal.

With reference to the seventh implementation of the first aspect of the present invention or the eighth implementation of the first aspect of the present invention, in a ninth implementation of the first aspect of the present invention, after the generating, by the core network entity, a second message, the method further includes sending, by the core network entity, the second message to the second terminal, where the second message includes indication information used to indicate that the first terminal is allowed to associate with the second terminal, so that the second terminal establishes the association with the first terminal according to the indication information.

With reference to the seventh implementation of the first aspect of the present invention or the eighth implementation of the first aspect of the present invention, in a tenth implementation of the first aspect of the present invention, after the generating, by the core network entity, a second message, the method further includes sending, by the core network entity, the second message to the first terminal, where the second message includes indication information used to indicate that the first terminal is allowed to associate with the second terminal, and a target key, where the target key is a key on an air interface of a direct channel between the first terminal and the second terminal, so that the second terminal sends the target key to the first terminal and that the first terminal establishes the association with the second terminal according to the indication information and the target key.

With reference to the first aspect of the present invention, in an eleventh implementation of the first aspect of the present invention, the receiving, by a core network entity, a first message includes receiving, by the core network entity, the first message sent by the first terminal by using the second terminal, where the first message includes an identity of the first terminal. After the receiving, by a core network entity, a first message, the method further includes, if the core network entity determines that the identity of the first terminal included in the first message satisfies a preset requirement, determining, by the core network entity, that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the first aspect of the present invention, in a twelfth implementation of the first aspect of the present invention, the receiving, by a core network entity, a first message includes receiving, by the core network entity, the first message sent by the first terminal by using the second terminal, where the first message includes an identity of the first terminal. After the receiving, by a core network entity, a first message, the method further includes sending, by the core network entity, a third message to the second terminal, where the third message is used to request the second terminal to determine whether the first terminal is allowed to associate. The method also includes receiving, by the core network entity, a fourth message returned by the second terminal, where the fourth message includes a determining result of the second terminal, and determining, by the core network entity according to the determining result, whether the first terminal is allowed to associate with the second terminal.

With reference to the eleventh implementation of the first aspect of the present invention or the twelfth implementation of the first aspect of the present invention, in a thirteenth implementation of the first aspect of the present invention, after the generating, by the core network entity, a second message, the method further includes sending, by the core network entity, the second message to the first terminal by using the second terminal, where the second message includes indication information used to indicate that the first terminal is allowed to associate with the second terminal. The method also includes sending, by the core network entity, a sixth message to the second terminal, where the sixth message includes the indication information used to indicate that the first terminal is allowed to associate with the second terminal, so that the first terminal and the second terminal establish the association according to the second message and the sixth message.

With reference to the eleventh implementation of the first aspect of the present invention or the twelfth implementation of the first aspect of the present invention, in a fourteenth implementation of the first aspect of the present invention, after the generating, by the core network entity, a second message, the method further includes sending, by the core network entity, the second message to the first terminal by using the second terminal, where the second message includes indication information used to indicate that the first terminal is allowed to associate with the second terminal, and a target key. The method also includes sending, by the core network entity, a sixth message to the second terminal, where the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

With reference to the first aspect of the present invention, in a fifteenth implementation of the first aspect of the present invention, the receiving, by a core network entity, a first message includes receiving, by the core network entity, the first message sent by the second terminal, where the first message is used to indicate the second terminal allowed to establish the association with the first terminal. The generating, by the core network entity, a second message includes generating, by the core network entity, the second message including a target key, where the target key is a key on an air interface of a direct channel between the first terminal and the second terminal. After the generating, by the core network entity, a second message, the method further includes sending, by the core network entity, the second message to the second terminal, so that the second terminal forwards the second message to the first terminal.

With reference to the fifteenth implementation of the first aspect of the present invention, in a sixteenth implementation of the first aspect of the present invention, the method further includes sending, by the core network entity, a third list to the second terminal, where the third list includes an identity of one or more first terminals allowed to associate with the second terminal, so that when the second terminal determines that an identity of the first terminal is included in the third list or that a converted identity of the first terminal is included in the third list, the second terminal determines that the first terminal is allowed to associate with the second terminal.

With reference to the first implementation of the first aspect of the present invention to the sixteenth implementation of the first aspect of the present invention, in a seventeenth implementation of the first aspect of the present invention, the identity of the second terminal is an identity used for broadcasting on a target air interface by the second terminal, or a globally unique temporary terminal identity (GUTI) of the second terminal, or a mobile station international integrated services digital network (ISDN) number (MSISDN) of the second terminal, or an international mobile equipment identity (IMEI) of the second terminal, and the target air interface is the air interface of the direct channel between the first terminal and the second terminal. Also, the identity of the first terminal is an IMEI of the first terminal, or a MSISDN of the first terminal, or an ISDN of the first terminal, or a GUTI of the first terminal, or an IP (internet protocol) multimedia public identity (IMPU) of the first terminal.

According to a second aspect of the present invention, a device association method is provided and includes sending, by a first terminal, a first message to a core network entity, so that the core network entity generates a second message when the core network entity determines, according to the first message, that the first terminal is allowed to associate with a second terminal. The method also includes receiving, by the first terminal, the second message, where the second message is used to establish an association between the first terminal and the second terminal, so that the first terminal can connect to a network by using the second terminal.

With reference to the second aspect of the present invention, in a first implementation of the second aspect of the present invention, before the sending, by a first terminal, a first message to a core network entity, the method further includes performing, by the first terminal, monitoring to obtain an identity of one or more target second terminals, where the target second terminal is a terminal that is monitored by the first terminal and whose signal strength is greater than a preset value. The method also includes generating, by the first terminal, the first message, where the first message includes a first list, and the first list includes the identity of the one or more target second terminals monitored by the first terminal, so that the core network entity determines, according to the first list, the second terminal allowed to associate with the first terminal.

With reference to the first implementation of the second aspect of the present invention, in a second implementation of the second aspect of the present invention, the first list includes the identity of the one or more target second terminals and corresponding signal strength of each target second terminal.

With reference to the second aspect of the present invention, in a third implementation of the second aspect of the present invention, the sending, by a first terminal, a first message to a core network entity includes sending, by the first terminal, the first message to the second terminal, so that the second terminal forwards the first message to the core network entity, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the second aspect of the present invention, in a fourth implementation of the second aspect of the present invention, the sending, by a first terminal, a first message to a core network entity includes sending, by the first terminal, the first message to the second terminal, so that the second terminal forwards the first message to the core network entity, where the first message includes an identity of the first terminal, so that the core network entity sends a third message to the second terminal, where the third message is used to request the second terminal to determine whether the first terminal is allowed to associate, and the core network entity receives a fourth message returned by the second terminal, where the fourth message includes a determining result of the second terminal, and the core network entity determines, according to the determining result, whether the first terminal is allowed to associate with the second terminal.

With reference to the third implementation of the second aspect of the present invention or the fourth implementation of the second aspect of the present invention, in a fifth implementation of the second aspect of the present invention, the receiving, by the first terminal, the second message includes receiving, by the first terminal, the second message sent by the second terminal, where the second message is a message sent by the core network entity to the first terminal by using the second terminal, the second message includes indication information used to indicate that the first terminal is allowed to associate with the second terminal, the first message is further used to trigger the core network entity to send a sixth message to the second terminal, and the sixth message includes the indication information used to indicate that the first terminal is allowed to associate with the second terminal, so that the first terminal and the second terminal establish the association according to the second message and the sixth message.

With reference to the third implementation of the second aspect of the present invention or the fourth implementation of the second aspect of the present invention, in a sixth implementation of the second aspect of the present invention, the receiving, by the first terminal, the second message includes receiving, by the first terminal, the second message sent by the second terminal, where the second message is a message sent by the core network entity to the first terminal by using the second terminal, the second message includes indication information used to indicate that the first terminal is allowed to associate with the second terminal, and a target key, the first message is further used to trigger the core network entity to send a sixth message to the second terminal, the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

With reference to the first implementation of the second aspect of the present invention to the sixth implementation of the second aspect of the present invention, in a seventh implementation of the second aspect of the present invention, an identity of the second terminal is an identity used for broadcasting on a target air interface by the second terminal, or a GUTI of the second terminal, or a MSISDN of the second terminal, or an IMEI of the second terminal, and the target air interface is the air interface of the direct channel between the first terminal and the second terminal. Also, the identity of the first terminal is an IMEI of the first terminal, or a MSISDN of the first terminal, or an ISDN of the first terminal, or a GUTI of the first terminal, or an IMPU of the first terminal.

According to a third aspect of the present invention, a device association method is provided and includes sending, by a second terminal, a first message to a core network entity, so that the core network entity generates a second message when the core network entity determines, according to the first message, that a first terminal is allowed to associate with the second terminal, where the second message is used to establish an association between the first terminal and the second terminal, so that the first terminal can connect to a network by using the second terminal.

With reference to the third aspect of the present invention, in a first implementation of the third aspect of the present invention, before the sending, by a second terminal, a first message to a core network entity, the method further includes generating, by the second terminal, the first message, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the third aspect of the present invention, in a second implementation of the third aspect of the present invention, before the sending, by a second terminal, a first message to a core network entity, the method further includes generating, by the second terminal, the first message, where the first message includes an identity of the first terminal, the first message is used to trigger the core network entity to send a third message to the second terminal, and the third message is used to request the second terminal to determine whether the first terminal is allowed to associate with the second terminal. The method also includes receiving, by the second terminal, the third message. The method further includes receiving, by the second terminal according to the third message, an operation instruction that is entered by a user and used to instruct whether to allow the first terminal to associate with the second terminal. The method still further includes generating, by the second terminal, a determining result according to the operation instruction entered by the user, where the determining result is used to indicate to the user whether the first terminal is allowed to associate with the second terminal. The method also includes sending, by the second terminal, a fourth message to the core network entity, where the fourth message includes the determining result.

With reference to the first implementation of the third aspect of the present invention or the second implementation of the third aspect of the present invention, in a third implementation of the third aspect of the present invention, after the sending, by a second terminal, a first message to a core network entity, the method further includes receiving, by the second terminal, the second message sent by the core network entity, where the second message includes indication information used to indicate that the first terminal is allowed to associate with the second terminal. The method also includes sending, by the second terminal, the second message to the first terminal, so that the first terminal establishes the association with the second terminal according to the second message.

With reference to the first implementation of the third aspect of the present invention or the second implementation of the third aspect of the present invention, in a fourth implementation of the third aspect of the present invention, after the sending, by a second terminal, a first message to a core network entity, the method further includes receiving, by the second terminal, the second message sent by the core network entity, where the second message includes indication information used to indicate that the first terminal is allowed to associate with the second terminal, and a target key, and the target key is a key on an air interface of a direct channel between the first terminal and the second terminal. The method also includes sending, by the second terminal, the target key to the first terminal, so that the first terminal establishes the association with the second terminal according to the indication information and the target key.

With reference to the third aspect of the present invention, in a fifth implementation of the third aspect of the present invention, before the sending, by a second terminal, a first message to a core network entity, the method further includes generating, by the second terminal, the first message, where the first message is used to indicate the second terminal allowed to establish the association with the first terminal. After the sending, by a second terminal, a first message to a core network entity, the method further includes receiving, by the second terminal, the second message that includes a target key and is sent by the core network entity, where the target key is a key on an air interface of a direct channel between the first terminal and the second terminal; and forwarding, by the second terminal, the second message to the first terminal.

With reference to the fifth implementation of the third aspect of the present invention, in a sixth implementation of the third aspect of the present invention, before the generating, by the second terminal, the first message, the method further includes receiving, by the second terminal, a third list sent by the core network entity, where the third list includes an identity of one or more first terminals allowed to associate with the second terminal. When the second terminal determines that an identity of the first terminal is included in the third list or that a converted identity of the first terminal is included in the third list, determining, by the second terminal, that the first terminal is allowed to associate with the second terminal.

With reference to the method in any one of the first implementation of the third aspect of the present invention to the sixth implementation of the third aspect of the present invention, in a seventh implementation of the third aspect of the present invention, an identity of the second terminal is an identity used for broadcasting on a target air interface by the second terminal, or a GUTI of the second terminal, or a MSISDN of the second terminal, or an IMEI of the second terminal, and the target air interface is the air interface of the direct channel between the first terminal and the second terminal. The identity of the first terminal is an IMEI of the first terminal, or a MSISDN of the first terminal, or an ISDN of the first terminal, or a GUTI of the first terminal, or an IMPU of the first terminal.

According to a fourth aspect of the present invention, a device association method is provided and includes receiving, by a second terminal, a seventh message sent by a first terminal. The method further includes determining, by the second terminal according to the seventh message and a third list, whether the first terminal is allowed to associate with the second terminal, where the third list includes an identity of one or more first terminals allowed to associate with the second terminal.

With reference to the fourth aspect of the present invention, in a first implementation of the fourth aspect of the present invention, the third list is pre-stored by the second terminal. Alternatively, before the determining, by the second terminal according to the seventh message and a third list, whether the first terminal is allowed to associate with the second terminal, the method further includes receiving, by the second terminal, the third list sent by the core network entity.

With reference to the fourth aspect of the present invention or the first implementation of the fourth aspect of the present invention, in a second implementation of the fourth aspect of the present invention, the seventh message includes an identity of the first terminal, and the determining, by the second terminal according to the seventh message and a third list, whether the first terminal is allowed to associate with the second terminal includes determining, by the second terminal, whether the identity of the first terminal included in the seventh message is included in the third list or whether a converted identity of the first terminal is included in the third list. If so, determining, by the second terminal, that the first terminal is allowed to associate with the second terminal. If not, receiving, by the second terminal, an operation instruction that is entered by a user and used to instruct whether to allow the first terminal to associate with the second terminal. The method further includes generating, by the second terminal, a determining result according to the operation instruction entered by the user, where the determining result is used to indicate to the user whether the first terminal is allowed to associate with the second terminal. The method also includes sending, by the second terminal, a fourth message to the core network entity, where the fourth message includes the determining result.

With reference to the fourth aspect of the present invention to the second implementation of the fourth aspect of the present invention, in a third implementation of the fourth aspect of the present invention, the method further includes, when the second terminal determines that the first terminal associates with the second terminal, sending, by the second terminal, a first message to the core network entity. The method also includes receiving, by the second terminal, a second message that includes a target key and is sent by the core network entity, where the second message is used to establish an association between the first terminal and the second terminal, and the target key is a key on an air interface of a direct channel between the first terminal and the second terminal. The method further includes forwarding, by the second terminal, the second message to the first terminal, so that the first terminal establishes the association with the second terminal.

According to a fifth aspect of the present invention, a core network entity is provided and includes a first receiving unit, configured to receive a first message. The core network entity also includes a first generation unit, configured to generate a second message when it is determined, according to the first message, that a first terminal is allowed to associate with a second terminal, where the second message is used to establish an association between the first terminal and the second terminal, so that the first terminal can connect to a network by using the second terminal.

With reference to the fifth aspect of the present invention, in a first implementation of the fifth aspect of the present invention, the first receiving unit is further configured to receive the first message sent by the first terminal, where the first message includes a first list, the first list includes an identity of one or more target second terminals monitored by the first terminal, and the target second terminal is a terminal that is monitored by the first terminal and whose signal strength is greater than a preset value. The core network entity further includes a first determining unit, configured to determine, according to the first list, the second terminal allowed to associate with the first terminal.

With reference to the first implementation of the fifth aspect of the present invention, in a second implementation of the fifth aspect of the present invention, the first determining unit is further configured to: if it is determined that an intersection exists between the first list and a second list, select the second terminal from the intersection, where the first determining unit includes the second list, and the second list includes an identity of one or more second terminals allowed to associate with the first terminal.

With reference to the second implementation of the fifth aspect of the present invention, in a third implementation of the fifth aspect of the present invention, the first determining unit is further configured to select a target second terminal having greatest signal strength from the intersection as the second terminal, where the first list includes the identity of the one or more target second terminals and corresponding signal strength of each target second terminal.

With reference to the first implementation of the fifth aspect of the present invention, in a fourth implementation of the fifth aspect of the present invention, the first list includes the identity of the one or more target second terminals and corresponding signal strength of each target second terminal, and the first determining unit includes a selection module, configured to select a target second terminal having greatest signal strength from the first list as the second terminal. The first determining unit also includes a first sending module, configured to send a third message to the second terminal, where the third message is used to request the second terminal to determine whether the first terminal is allowed to associate with the second terminal. The first determining unit further includes a first receiving module, configured to receive a fourth message returned by the second terminal, where the fourth message includes a determining result of the second terminal, and the first receiving module determines, according to the determining result, whether the first terminal is allowed to associate with the second terminal.

With reference to the first implementation of the fifth aspect of the present invention to the fourth implementation of the fifth aspect of the present invention, in a fifth implementation of the fifth aspect of the present invention, the core network entity further includes a first sending unit, configured to send the second message to the first terminal, where the second message includes an identity of the second terminal. The core network entity also includes a second sending unit, configured to send a fifth message to the second terminal, where the fifth message includes an identity of the first terminal, so that the first terminal and the second terminal establish the association according to the second message and the fifth message.

With reference to the first implementation of the fifth aspect of the present invention to the fourth implementation of the fifth aspect of the present invention, in a sixth implementation of the fifth aspect of the present invention, the core network entity further includes a third sending unit, configured to send the second message to the first terminal, where the second message includes an identity of the second terminal and a target key. The core network entity also includes a fourth sending unit, configured to send a fifth message to the second terminal, where the fifth message includes an identity of the first terminal and the target key, and the target key is a key on an air interface of a direct channel between the first terminal and the second terminal, so that the first terminal and the second terminal establish the association according to the second message and the fifth message.

With reference to the fifth aspect of the present invention, in a seventh implementation of the fifth aspect of the present invention, the first receiving unit is further configured to receive the first message sent by the second terminal, where the first message includes an identity of the first terminal. The first generation unit is further configured to: if the first generation unit determines that the identity of the first terminal included in the first message is included in a third list or that a converted identity of the first terminal is included in a third list, determine, by the first generation unit, that the first terminal is allowed to associate with the second terminal, where the first generation unit includes the third list, and the third list includes an identity of one or more first terminals allowed to associate with the second terminal.

With reference to the fifth aspect of the present invention, in an eighth implementation of the fifth aspect of the present invention, the first receiving unit is further configured to receive the first message sent by the second terminal, where the first message includes an identity of the first terminal. The first generation unit includes a second sending module, configured to send a third message to the second terminal, where the third message is used to request the second terminal to determine whether the first terminal is allowed to associate with the second terminal. The first generation unit also includes a second receiving module, configured to receive a fourth message returned by the second terminal, where the fourth message includes a determining result of the second terminal, and the second receiving module determines, according to the determining result, whether the first terminal is allowed to associate with the second terminal.

With reference to the seventh implementation of the fifth aspect of the present invention or the eighth implementation of the fifth aspect of the present invention, in a ninth implementation of the fifth aspect of the present invention, the core network entity further includes a fifth sending unit, configured to send the second message to the second terminal, where the second message includes indication information used to indicate that the first terminal is allowed to associate with the second terminal, so that the second terminal establishes the association with the first terminal according to the indication information.

With reference to the seventh implementation of the fifth aspect of the present invention or the eighth implementation of the fifth aspect of the present invention, in a tenth implementation of the fifth aspect of the present invention, the core network entity further includes a sixth sending unit, configured to send the second message to the first terminal, where the second message includes indication information used to indicate that the first terminal is allowed to associate with the second terminal, and a target key, where the target key is a key on an air interface of a direct channel between the first terminal and the second terminal, so that the second terminal sends the target key to the first terminal and that the first terminal establishes the association with the second terminal according to the indication information and the target key.

With reference to the fifth aspect of the present invention, in an eleventh implementation of the fifth aspect of the present invention, the first receiving unit is further configured to receive the first message sent by the first terminal by using the second terminal, where the first message includes an identity of the first terminal. The core network entity further includes a second determining unit, configured to, if it is determined that the identity of the first terminal included in the first message is included in a third list or that a converted identity of the first terminal is included in a third list, determine that the first terminal is allowed to associate with the second terminal, where the second determining unit includes the third list, and the third list includes an identity of one or more first terminals allowed to associate with the second terminal.

With reference to the fifth aspect of the present invention, in a twelfth implementation of the fifth aspect of the present invention, the first receiving unit is further configured to receive the first message sent by the first terminal by using the second terminal, where the first message includes an identity of the first terminal. The core network entity further includes a seventh sending unit, configured to send a third message to the second terminal, where the third message is used to request the second terminal to determine whether the first terminal is allowed to associate. The core network entity also includes a second receiving unit, configured to receive a fourth message returned by the second terminal, where the fourth message includes a determining result of the second terminal, and the second receiving unit determines, according to the determining result, whether the first terminal is allowed to associate with the second terminal.

With reference to the eleventh implementation of the fifth aspect of the present invention or the twelfth implementation of the fifth aspect of the present invention, in a thirteenth implementation of the fifth aspect of the present invention, the core network entity further includes an eighth sending unit, configured to send the second message to the first terminal by using the second terminal, where the second message includes indication information used to indicate that the first terminal is allowed to associate with the second terminal. The core network entity also includes a ninth sending unit, configured to send a sixth message to the second terminal, where the sixth message includes the indication information used to indicate that the first terminal is allowed to associate with the second terminal, so that the first terminal and the second terminal establish the association according to the second message and the sixth message.

With reference to the eleventh implementation of the fifth aspect of the present invention or the twelfth implementation of the fifth aspect of the present invention, in a fourteenth implementation of the fifth aspect of the present invention, the core network entity further includes a tenth sending unit, configured to send the second message to the first terminal by using the second terminal, where the second message includes indication information used to indicate that the first terminal is allowed to associate with the second terminal, and a target key. The core network entity also includes eleventh sending unit, configured to send a sixth message to the second terminal, where the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

With reference to the fifth aspect of the present invention, in a fifteenth implementation of the fifth aspect of the present invention, the first receiving unit is further configured to receive the first message sent by the second terminal, where the first message is used to indicate the second terminal allowed to establish the association with the first terminal. The first generation unit is further configured to generate the second message including a target key, where the target key is a key on an air interface of a direct channel between the first terminal and the second terminal. The core network entity further includes a twelfth sending unit, configured to send the second message to the second terminal, so that the second terminal forwards the second message to the first terminal.

With reference to the fifteenth implementation of the fifth aspect of the present invention, in a sixteenth implementation of the fifth aspect of the present invention, the core network entity further includes a thirteenth sending unit, configured to send a third list to the second terminal, where the third list includes an identity of one or more first terminals allowed to associate with the second terminal, so that when the second terminal determines that an identity of the first terminal is included in the third list or that a converted identity of the first terminal is included in the third list, the second terminal determines that the first terminal is allowed to associate with the second terminal.

According to a sixth aspect of the present invention, a first terminal is provided and includes a fourteenth sending unit, configured to send a first message to a core network entity, so that the core network entity generates a second message when the core network entity determines, according to the first message, that the first terminal is allowed to associate with a second terminal. The first terminal is further includes a third receiving unit, configured to receive the second message, where the second message is used to establish an association between the first terminal and the second terminal, so that the first terminal can connect to a network by using the second terminal.

With reference to the sixth aspect of the present invention, in a first implementation of the sixth aspect of the present invention, the first terminal further includes a monitoring unit, configured to perform monitoring to obtain an identity of one or more target second terminals, where the target second terminal is a terminal that is monitored by the monitoring unit and whose signal strength is greater than a preset value. The first terminal also includes a second generation unit, configured to generate the first message, where the first message includes a first list, and the first list includes the identity of the one or more target second terminals monitored by the monitoring unit, so that the core network entity determines, according to the first list, the second terminal allowed to associate with the first terminal.

With reference to the sixth aspect of the present invention, in a second implementation of the sixth aspect of the present invention, the fourteenth sending unit is further configured to send the first message to the second terminal, so that the second terminal forwards the first message to the core network entity, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the sixth aspect of the present invention, in a third implementation of the sixth aspect of the present invention, the fourteenth sending unit is further configured to send the first message to the second terminal, so that the second terminal forwards the first message to the core network entity, where the first message includes an identity of the first terminal, so that the core network entity sends a third message to the second terminal, where the third message is used to request the second terminal to determine whether the first terminal is allowed to associate, and the core network entity receives a fourth message returned by the second terminal, where the fourth message includes a determining result of the second terminal, and the core network entity determines, according to the determining result, whether the first terminal is allowed to associate with the second terminal.

With reference to the second implementation of the sixth aspect of the present invention or the third implementation of the sixth aspect of the present invention, in a fourth implementation of the sixth aspect of the present invention, the third receiving unit is further configured to receive the second message sent by the second terminal, where the second message is a message sent by the core network entity to the first terminal by using the second terminal, the second message includes indication information used to indicate that the first terminal is allowed to associate with the second terminal, the first message is further used to trigger the core network entity to send a sixth message to the second terminal, and the sixth message includes the indication information used to indicate that the first terminal is allowed to associate with the second terminal, so that the first terminal and the second terminal establish the association according to the second message and the sixth message.

With reference to the second implementation of the sixth aspect of the present invention or the third implementation of the sixth aspect of the present invention, in a fifth implementation of the sixth aspect of the present invention, the third receiving unit is further configured to receive the second message sent by the second terminal, where the second message is a message sent by the core network entity to the first terminal by using the second terminal, the second message includes indication information used to indicate that the first terminal is allowed to associate with the second terminal, and a target key, the first message is further used to trigger the core network entity to send a sixth message to the second terminal, the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

According to a seventh aspect of the present invention, a second terminal is provided and includes a fifteenth sending unit, configured to send a first message to a core network entity, so that the core network entity generates a second message when the core network entity determines, according to the first message, that a first terminal is allowed to associate with the second terminal, where the second message is used to establish an association between the first terminal and the second terminal, so that the first terminal can connect to a network by using the second terminal.

With reference to the seventh aspect of the present invention, in a first implementation of the seventh aspect of the present invention, the second terminal further includes a third generation unit, configured to generate the first message, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the seventh aspect of the present invention, in a second implementation of the seventh aspect of the present invention, the second terminal further includes a fourth generation unit, configured to generate the first message, where the first message includes an identity of the first terminal, the first message is used to trigger the core network entity to send a third message to the second terminal, and the third message is used to request the second terminal to determine whether the first terminal is allowed to associate with the second terminal. The second terminal also includes a fourth receiving unit, configured to receive the third message. The second terminal further includes a fifth receiving unit, configured to receive, according to the third message, an operation instruction that is entered by a user and used to instruct whether to allow the first terminal to associate with the second terminal. The second terminal also includes a fifth generation unit, configured to generate a determining result according to the operation instruction entered by the user, where the determining result is used to indicate to the user whether the first terminal is allowed to associate with the second terminal. The second terminal further includes a sixteenth sending unit, configured to send a fourth message to the core network entity, where the fourth message includes the determining result.

With reference to the first implementation of the seventh aspect of the present invention or the second implementation of the seventh aspect of the present invention, in a third implementation of the seventh aspect of the present invention, the second terminal further includes a sixth receiving unit, configured to receive the second message sent by the core network entity, where the second message includes indication information used to indicate that the first terminal is allowed to associate with the second terminal. The second terminal also includes a seventeenth sending unit, configured to send the second message to the first terminal, so that the first terminal establishes the association with the second terminal according to the second message.

With reference to the first implementation of the seventh aspect of the present invention or the second implementation of the seventh aspect of the present invention, in a fourth implementation of the seventh aspect of the present invention, the second terminal further includes a seventh receiving unit, configured to receive the second message sent by the core network entity, where the second message includes indication information used to indicate that the first terminal is allowed to associate with the second terminal, and a target key, and the target key is a key on an air interface of a direct channel between the first terminal and the second terminal. The second terminal also includes an eighteenth sending unit, configured to send the target key to the first terminal, so that the first terminal establishes the association with the second terminal according to the indication information and the target key.

With reference to the seventh aspect of the present invention, in a fifth implementation of the seventh aspect of the present invention, the second terminal further includes a sixth generation unit, configured to generate the first message, where the first message is used to indicate the second terminal allowed to establish the association with the first terminal. The second terminal further includes an eighth receiving unit, configured to receive the second message that includes a target key and is sent by the core network entity, where the target key is a key on an air interface of a direct channel between the first terminal and the second terminal. The second terminal further includes a nineteenth sending unit, configured to forward the second message to the first terminal.

With reference to the seventh aspect of the present invention, in a sixth implementation of the seventh aspect of the present invention the second terminal further includes a ninth receiving unit, configured to receive a third list sent by the core network entity, where the third list includes an identity of one or more first terminals allowed to associate with the second terminal. The second terminal also includes a third determining unit, configured to: when determining that an identity of the first terminal is included in the third list or that a converted identity of the first terminal is included in the third list, determine that the first terminal is allowed to associate with the second terminal.

According to an eighth aspect of the present invention, a second terminal is provided and includes a tenth receiving unit, configured to receive a seventh message sent by a first terminal. The second terminal also includes a fourth determining unit, configured to determine, according to the seventh message and a third list, whether the first terminal is allowed to associate with the second terminal, where the third list includes an identity of one or more first terminals allowed to associate with the second terminal.

With reference to the eighth aspect of the present invention, in a first implementation of the eighth aspect of the present invention, the second terminal further includes a storage unit, configured to store the third list. Alternatively, the second terminal further includes an eleventh receiving unit, configured to receive the third list sent by the core network entity.

With reference to the eighth aspect of the present invention or the first implementation of the eighth aspect of the present invention, in a second implementation of the eighth aspect of the present invention, the seventh message includes an identity of the first terminal, and the fourth determining unit includes a first determining module, configured to determine whether the identity of the first terminal included in the seventh message is included in the third list or whether a converted identity of the first terminal is included in the third list. The fourth determining unit also includes a second determining module, configured to: if the first determining module determines that the identity of the first terminal included in the seventh message is included in the third list or that the converted identity of the first terminal is included in the third list, determine that the first terminal is allowed to associate with the second terminal. The fourth determining unit further includes a third receiving module, configured to: if the first determining module determines that the identity of the first terminal included in the seventh message is not included in the third list or that the converted identity of the first terminal is not included in the third list, receive an operation instruction that is entered by a user and used to instruct whether to allow the first terminal to associate with the second terminal. The fourth determining unit also includes a generation module, configured to generate a determining result according to the operation instruction entered by the user, where the determining result is used to indicate to the user whether the first terminal is allowed to associate with the second terminal. The fourth determining unit further includes a third sending module, configured to send a fourth message to the core network entity, where the fourth message includes the determining result.

With reference to the second terminal in any one of the eighth aspect of the present invention or the second implementation of the eighth aspect of the present invention, in a third implementation of the eighth aspect of the present invention, the second terminal further includes a twentieth sending unit, configured to send a first message to the core network entity when the second terminal determines that the first terminal associates with the second terminal. The second terminal also includes a twelfth receiving unit, configured to receive a second message that includes a target key and is sent by the core network entity, where the second message is used to establish an association between the first terminal and the second terminal, and the target key is a key on an air interface of a direct channel between the first terminal and the second terminal. The second terminal further includes a twenty-first sending unit, configured to forward the second message to the first terminal, so that the first terminal establishes the association with the second terminal.

According to a ninth aspect of the present invention, a communications system is provided and includes: the core network entity in any one of the fifth aspect of the present invention to the sixteenth implementation of the fifth aspect of the present invention, the first terminal in any one of the sixth aspect of the present invention to the fifth implementation of the sixth aspect of the present invention, and the second terminal in any one of the seventh aspect of the present invention to the sixth implementation of the seventh aspect of the present invention.

According to a tenth aspect of the present invention, a core network entity is provided and includes a transmitter, a receiver, and a processor, where the receiver is configured to receive a first message. The processor is configured to generate a second message when determining, according to the first message, that a first terminal is allowed to associate with a second terminal, where the second message is used to establish an association between the first terminal and the second terminal, so that the first terminal can connect to a network by using the second terminal.

With reference to the tenth aspect of the present invention, in a first implementation of the tenth aspect of the present invention, the receiver is configured to receive the first message sent by the first terminal, where the first message includes a first list, the first list includes an identity of one or more target second terminals monitored by the first terminal, and the target second terminal is a terminal that is monitored by the first terminal and whose signal strength is greater than a preset value. The processor is further configured to determine, according to the first list, the second terminal allowed to associate with the first terminal.

With reference to the first implementation of the tenth aspect of the present invention, in a second implementation of the tenth aspect of the present invention, the processor is further configured to, if the processor determines that an intersection exists between the first list and a second list, select, by the processor, the second terminal from the intersection, where the processor includes the second list, and the second list includes an identity of one or more second terminals allowed to associate with the first terminal.

With reference to the second implementation of the tenth aspect of the present invention, in a third implementation of the tenth aspect of the present invention, the processor is further configured to select a target second terminal having greatest signal strength from the intersection as the second terminal, where the first list includes the identity of the one or more target second terminals and corresponding signal strength of each target second terminal.

With reference to the first implementation of the tenth aspect of the present invention, in a fourth implementation of the tenth aspect of the present invention, the first list includes the identity of the one or more target second terminals and corresponding signal strength of each target second terminal, and the processor is further configured to select a target second terminal having greatest signal strength from the first list as the second terminal. The transmitter is further configured to send a third message to the second terminal, where the third message is used to request the second terminal to determine whether the first terminal is allowed to associate with the second terminal. The receiver is further configured to receive a fourth message returned by the second terminal, where the fourth message includes a determining result of the second terminal. The processor is further configured to determine, according to the determining result, whether the first terminal is allowed to associate with the second terminal.

With reference to the first implementation of the tenth aspect of the present invention to the fourth implementation of the tenth aspect of the present invention, in a fifth implementation of the tenth aspect of the present invention, the transmitter is further configured to send the second message to the first terminal, where the second message includes an identity of the second terminal. The transmitter is further configured to send a fifth message to the second terminal, where the fifth message includes an identity of the first terminal, so that the first terminal and the second terminal establish the association according to the second message and the fifth message.

With reference to the first implementation of the tenth aspect of the present invention to the fourth implementation of the tenth aspect of the present invention, in a sixth implementation of the tenth aspect of the present invention, the transmitter is further configured to send the second message to the first terminal, where the second message includes an identity of the second terminal and a target key. The transmitter is further configured to send a fifth message to the second terminal, where the fifth message includes an identity of the first terminal and the target key, and the target key is a key on an air interface of a direct channel between the first terminal and the second terminal, so that the first terminal and the second terminal establish the association according to the second message and the fifth message.

With reference to the tenth aspect of the present invention, in a seventh implementation of the tenth aspect of the present invention, the receiver is further configured to receive the first message sent by the second terminal, where the first message includes an identity of the first terminal. The processor is further configured to: if the processor determines that the identity of the first terminal included in the first message is included in a third list or that a converted identity of the first terminal is included in a third list, determine, by the processor, that the first terminal is allowed to associate with the second terminal, where the processor includes the third list, and the third list includes an identity of one or more first terminals allowed to associate with the second terminal.

With reference to the tenth aspect of the present invention, in an eighth implementation of the tenth aspect of the present invention, the receiver is configured to receive the first message sent by the second terminal, where the first message includes an identity of the first terminal. The transmitter is configured to send a third message to the second terminal, where the third message is used to request the second terminal to determine whether the first terminal is allowed to associate with the second terminal. The receiver is configured to receive a fourth message returned by the second terminal, where the fourth message includes a determining result of the second terminal. The processor is configured to determine, according to the determining result, whether the first terminal is allowed to associate with the second terminal.

With reference to the seventh implementation of the tenth aspect of the present invention or the eighth implementation of the tenth aspect of the present invention, in a ninth implementation of the tenth aspect of the present invention, the transmitter is configured to send the second message to the second terminal, where the second message includes indication information used to indicate that the first terminal is allowed to associate with the second terminal, so that the second terminal establishes the association with the first terminal according to the indication information.

With reference to the seventh implementation of the tenth aspect of the present invention or the eighth implementation of the tenth aspect of the present invention, in a tenth implementation of the tenth aspect of the present invention, the transmitter is configured to send the second message to the first terminal, where the second message includes indication information used to indicate that the first terminal is allowed to associate with the second terminal, and a target key, where the target key is a key on an air interface of a direct channel between the first terminal and the second terminal, so that the second terminal sends the target key to the first terminal and that the first terminal establishes the association with the second terminal according to the indication information and the target key.

With reference to the tenth aspect of the present invention, in an eleventh implementation of the tenth aspect of the present invention, the receiver is configured to receive the first message sent by the first terminal by using the second terminal, where the first message includes an identity of the first terminal. The processor is configured to: if it is determined that the identity of the first terminal included in the first message is included in a third list or that a converted identity of the first terminal is included in a third list, determine that the first terminal is allowed to associate with the second terminal, where the processor includes the third list, and the third list includes an identity of one or more first terminals allowed to associate with the second terminal.

With reference to the tenth aspect of the present invention, in a twelfth implementation of the tenth aspect of the present invention, the receiver is configured to receive the first message sent by the first terminal by using the second terminal, where the first message includes an identity of the first terminal. The transmitter is configured to send a third message to the second terminal, where the third message is used to request the second terminal to determine whether the first terminal is allowed to associate. The receiver is configured to receive a fourth message returned by the second terminal, where the fourth message includes a determining result of the second terminal, and the core network entity determines, according to the determining result, whether the first terminal is allowed to associate with the second terminal.

With reference to the eleventh implementation of the tenth aspect of the present invention or the twelfth implementation of the tenth aspect of the present invention, in a thirteenth implementation of the tenth aspect of the present invention, the transmitter is configured to send the second message to the first terminal by using the second terminal, where the second message includes indication information used to indicate that the first terminal is allowed to associate with the second terminal. The transmitter is configured to send a sixth message to the second terminal, where the sixth message includes the indication information used to indicate that the first terminal is allowed to associate with the second terminal, so that the first terminal and the second terminal establish the association according to the second message and the sixth message.

With reference to the eleventh implementation of the tenth aspect of the present invention or the twelfth implementation of the tenth aspect of the present invention, in a fourteenth implementation of the tenth aspect of the present invention, the transmitter is configured to send the second message to the first terminal by using the second terminal, where the second message includes indication information used to indicate that the first terminal is allowed to associate with the second terminal, and a target key. The transmitter is configured to send a sixth message to the second terminal, where the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

With reference to the tenth aspect of the present invention, in a fifteenth implementation of the tenth aspect of the present invention, the receiver is configured to receive the first message sent by the second terminal, where the first message is used to indicate the second terminal allowed to establish the association with the first terminal. The processor is configured to generate the second message including a target key, where the target key is a key on an air interface of a direct channel between the first terminal and the second terminal. The transmitter is configured to send the second message to the second terminal, so that the second terminal forwards the second message to the first terminal.

With reference to the fifteenth implementation of the tenth aspect of the present invention, in a sixteenth implementation of the tenth aspect of the present invention, the transmitter is configured to send a third list to the second terminal, where the third list includes an identity of one or more first terminals allowed to associate with the second terminal, so that when the second terminal determines that an identity of the first terminal is included in the third list or that a converted identity of the first terminal is included in the third list, the second terminal determines that the first terminal is allowed to associate with the second terminal.

According to an eleventh aspect of the present invention, a first terminal is provided and includes a transmitter, a receiver, and a processor, where the transmitter is configured to send a first message to a core network entity, so that the core network entity generates a second message when the core network entity determines, according to the first message, that the first terminal is allowed to associate with a second terminal. The receiver is configured to receive the second message, where the second message is used to establish an association between the first terminal and the second terminal, so that the first terminal can connect to a network by using the second terminal.

With reference to the eleventh aspect of the present invention, in a first implementation of the eleventh aspect of the present invention, the processor is configured to perform monitoring to obtain an identity of one or more target second terminals, where the target second terminal is a terminal that is monitored by the first terminal and whose signal strength is greater than a preset value, and generate the first message, where the first message includes a first list, and the first list includes the identity of the one or more target second terminals monitored by the first terminal, so that the core network entity determines, according to the first list, the second terminal allowed to associate with the first terminal. The first list includes the identity of the one or more target second terminals and corresponding signal strength of each target second terminal.

With reference to the first implementation of the eleventh aspect of the present invention, in a second implementation of the eleventh aspect of the present invention, the transmitter is configured to send the first message to the second terminal, so that the second terminal forwards the first message to the core network entity, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the eleventh aspect of the present invention, in a third implementation of the eleventh aspect of the present invention, the transmitter is configured to send the first message to the second terminal, so that the second terminal forwards the first message to the core network entity, where the first message includes an identity of the first terminal, so that the core network entity sends a third message to the second terminal, where the third message is used to request the second terminal to determine whether the first terminal is allowed to associate, and the core network entity receives a fourth message returned by the second terminal, where the fourth message includes a determining result of the second terminal, and the core network entity determines, according to the determining result, whether the first terminal is allowed to associate with the second terminal.

With reference to the second implementation of the eleventh aspect of the present invention or the third implementation of the eleventh aspect of the present invention, in a fourth implementation of the eleventh aspect of the present invention, the receiver is configured to receive the second message sent by the second terminal, where the second message is a message sent by the core network entity to the first terminal by using the second terminal, the second message includes indication information used to indicate that the first terminal is allowed to associate with the second terminal, the first message is further used to trigger the core network entity to send a sixth message to the second terminal, and the sixth message includes the indication information used to indicate that the first terminal is allowed to associate with the second terminal, so that the first terminal and the second terminal establish the association according to the second message and the sixth message.

With reference to the second implementation of the eleventh aspect of the present invention or the third implementation of the eleventh aspect of the present invention, in a fifth implementation of the eleventh aspect of the present invention, the receiver is configured to receive the second message sent by the second terminal, where the second message is a message sent by the core network entity to the first terminal by using the second terminal, the second message includes indication information used to indicate that the first terminal is allowed to associate with the second terminal, and a target key, the first message is further used to trigger the core network entity to send a sixth message to the second terminal, the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

According to a twelfth aspect of the present invention, a second terminal is provided and includes a transmitter, a receiver, and a processor, where the transmitter is configured to send a first message to a core network entity, so that the core network entity generates a second message when the core network entity determines, according to the first message, that a first terminal is allowed to associate with the second terminal, where the second message is used to establish an association between the first terminal and the second terminal, so that the first terminal can connect to a network by using the second terminal.

With reference to the twelfth aspect of the present invention, in a first implementation of the twelfth aspect of the present invention, the processor is configured to generate the first message, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

With reference to the twelfth aspect of the present invention, in a second implementation of the twelfth aspect of the present invention, the processor is configured to generate the first message, where the first message includes an identity of the first terminal, the first message is used to trigger the core network entity to send a third message to the second terminal, and the third message is used to request the second terminal to determine whether the first terminal is allowed to associate with the second terminal. The receiver is configured to receive the third message. The receiver is configured to receive, according to the third message, an operation instruction that is entered by a user and used to instruct whether to allow the first terminal to associate with the second terminal. The processor is configured to generate a determining result according to the operation instruction entered by the user, where the determining result is used to indicate to the user whether the first terminal is allowed to associate with the second terminal. The transmitter is configured to send a fourth message to the core network entity, where the fourth message includes the determining result.

With reference to the first implementation of the twelfth aspect of the present invention or the second implementation of the twelfth aspect of the present invention, in a third implementation of the twelfth aspect of the present invention, the receiver is configured to receive the second message sent by the core network entity, where the second message includes indication information used to indicate that the first terminal is allowed to associate with the second terminal. The transmitter is configured to send the second message to the first terminal, so that the first terminal establishes the association with the second terminal according to the second message.

With reference to the first implementation of the twelfth aspect of the present invention or the second implementation of the twelfth aspect of the present invention, in a fourth implementation of the twelfth aspect of the present invention, the receiver is configured to receive the second message sent by the core network entity, where the second message includes indication information used to indicate that the first terminal is allowed to associate with the second terminal, and a target key, and the target key is a key on an air interface of a direct channel between the first terminal and the second terminal. The transmitter is configured to send the target key to the first terminal, so that the first terminal establishes the association with the second terminal according to the indication information and the target key.

With reference to the twelfth aspect of the present invention, in a fifth implementation of the twelfth aspect of the present invention, the processor is configured to generate the first message, where the first message is used to indicate the second terminal allowed to establish the association with the first terminal. The receiver is configured to receive the second message that includes a target key and is sent by the core network entity, where the target key is a key on an air interface of a direct channel between the first terminal and the second terminal. The transmitter is configured to forward the second message to the first terminal.

With reference to the fifth implementation of the twelfth aspect of the present invention, in a sixth implementation of the twelfth aspect of the present invention, the receiver is configured to receive a third list sent by the core network entity, where the third list includes an identity of one or more first terminals allowed to associate with the second terminal. The processor is configured to, when determining that an identity of the first terminal is included in the third list or that a converted identity of the first terminal is included in the third list, determine that the first terminal is allowed to associate with the second terminal.

According to a thirteenth aspect of the present invention, a second terminal is provided and includes a transmitter, a receiver, and a processor, where the receiver is configured to receive a seventh message sent by a first terminal. The processor is configured to determine, according to the seventh message and a third list, whether the first terminal is allowed to associate with the second terminal, where the third list includes an identity of one or more first terminals allowed to associate with the second terminal.

With reference to the thirteenth aspect of the present invention, in a first implementation of the thirteenth aspect of the present invention, the third list is pre-stored by the second terminal. The receiver is configured to receive the third list sent by the core network entity.

With reference to the thirteenth aspect of the present invention or the first implementation of the thirteenth aspect of the present invention, in a second implementation of the thirteenth aspect of the present invention, the seventh message includes an identity of the first terminal. The processor is configured to determine whether the identity of the first terminal included in the seventh message is included in the third list or whether a converted identity of the first terminal is included in the third list. The processor is configured to: if the processor determines that the identity of the first terminal included in the seventh message is included in the third list or that the converted identity of the first terminal is included in the third list, determine, by the processor, that the first terminal is allowed to associate with the second terminal. The receiver is configured to: if the processor determines that the identity of the first terminal included in the seventh message is not included in the third list or that the converted identity of the first terminal is not included in the third list, receive, by the receiver, an operation instruction that is entered by a user and used to instruct whether to allow the first terminal to associate with the second terminal. The processor is configured to generate a determining result according to the operation instruction entered by the user, where the determining result is used to indicate to the user whether the first terminal is allowed to associate with the second terminal. The transmitter is configured to send a fourth message to the core network entity, where the fourth message includes the determining result.

With reference to the second terminal in any one of the thirteenth aspect of the present invention or the second implementation of the thirteenth aspect of the present invention, in a third implementation of the thirteenth aspect of the present invention, the transmitter is configured to send a first message to the core network entity when the second terminal determines that the first terminal associates with the second terminal. The receiver is configured to receive a second message that includes a target key and is sent by the core network entity, where the second message is used to establish an association between the first terminal and the second terminal, and the target key is a key on an air interface of a direct channel between the first terminal and the second terminal. The transmitter is configured to forward the second message to the first terminal, so that the first terminal establishes the association with the second terminal.

The present invention provides a device association method and a related device. The method includes: receiving, by a core network entity, a first message; and when the core network entity determines, according to the first message, that a first terminal is allowed to associate with a second terminal, generating, by the core network entity, a second message, where the second message is used to establish an association between the first terminal and the second terminal. Apparently, under control of the core network entity, the device association method shown in this embodiment can be used to implement an association relationship between the first terminal and the second terminal. Therefore, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

BRIEF DESCRIPTION OF THE DRAWINGS

For a more complete understanding of the present invention, and the advantages thereof, reference is now made to the following descriptions taken in conjunction with the accompanying drawings.

The present invention provides a device association method. A device association method provided by an embodiment can be used to implement an association between a wearable device and an intelligent terminal, so that the wearable device can connect to a network by using the intelligent terminal.

In the description of this embodiment, it is assumed that a first terminal is the wearable device, but this is not limited. The first terminal shown in this embodiment may be a terminal that can directly communicate with the network or can communicate with the network by using another terminal.

In the description of this embodiment, it is assumed that a second terminal is the intelligent terminal, but this is not limited. The intelligent terminal may be any terminal that can communicate with the network, such as a smartphone or a tablet computer. In the present invention, an association process between the first terminal and the second terminal enables the second terminal to determine that the first terminal is allowed to access the network by using the second terminal, and enables the first terminal to determine that the network can be accessed by using the second terminal.

The network herein is a core network of an operator. For example, in a fourth-generation mobile communications system environment, a core network entity included in the network may be a mobility management entity (MME), a serving gateway (GW), or a packet data network gateway (PDN GW). That the first terminal connects to the network by using the second terminal includes but is not limited to the following form: the first terminal sends data to the PDN GW by using the second terminal; or the first terminal sends signaling to the core network entity by using the second terminal.

Figure 1:
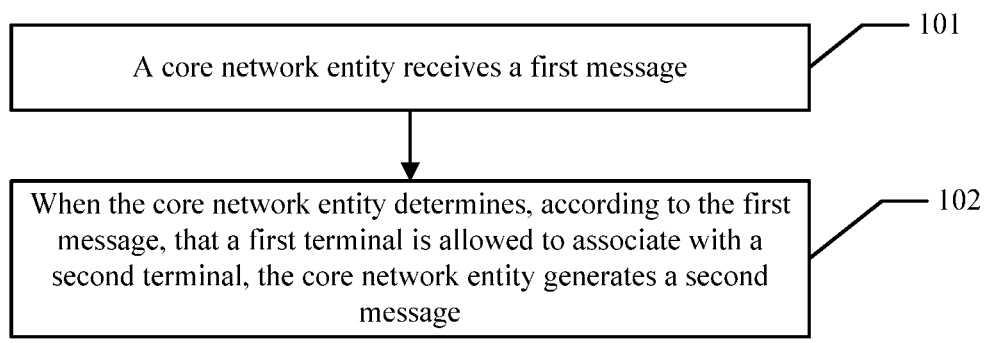
FIG. 1 is a flowchart of steps in an embodiment of a device association method according to an embodiment of the present invention.

First, refer to FIG. 1.

101. A core network entity receives a first message.

In this embodiment, a device that sends the first message is not limited, so long as after the core network entity receives the first message, the core network entity determines whether a first terminal is allowed to establish an association relationship with a second terminal.

In this embodiment, the core network entity is not limited, so long as the core network entity can communicate with the first terminal and the second terminal and can implement a certain control function. For example, in a fourth-generation mobile communications system environment, the core network entity may be a MME, but in a third-generation mobile communications system environment, the core network entity may be a serving GPRS (general packet radio service) support node (SGSN).

102. When the core network entity determines, according to the first message, that a first terminal is allowed to associate with a second terminal, the core network entity generates a second message.

The second message is used to establish an association between the first terminal and the second terminal.

This embodiment does not limit how the core network entity specifically determines that the first terminal is allowed to associate with the second terminal, so long as the second message used to establish the association between the first terminal and the second terminal can be generated when the first terminal is allowed to associate with the second terminal, so that the first terminal associated with the second terminal can connect to a network by using the second terminal.

Apparently, under control of the core network entity, the device association method shown in this embodiment can be used to implement an association relationship between the first terminal and the second terminal. Therefore, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

With reference to an accompanying drawing, the following describes in detail how the first terminal establishes an association relationship with the second terminal in this embodiment.

Figure 2:
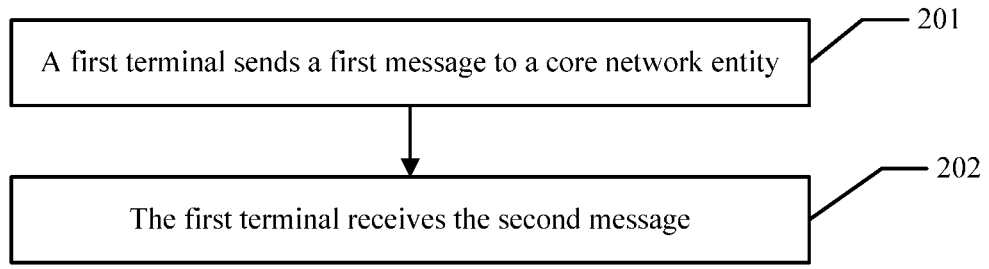
FIG. 2 is a flowchart of steps in an embodiment of a device association method according to an embodiment of the present invention.

With reference to FIG. 2, FIG. 2 shows how the first terminal establishes an association relationship with the second terminal if the first message is sent by the first terminal.

201. A first terminal sends a first message to a core network entity.

When the core network entity determines, according to the first message, that the first terminal is allowed to associate with a second terminal, the core network entity generates a second message.

202. The first terminal receives a second message.

The second message is used to establish an association between the first terminal and the second terminal.

Apparently, under control of a core network entity, the device association method shown in this embodiment can be used to implement an association relationship between the first terminal and the second terminal. Therefore, the first terminal can connect to a network by using the second terminal, and further, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

Figure 3:
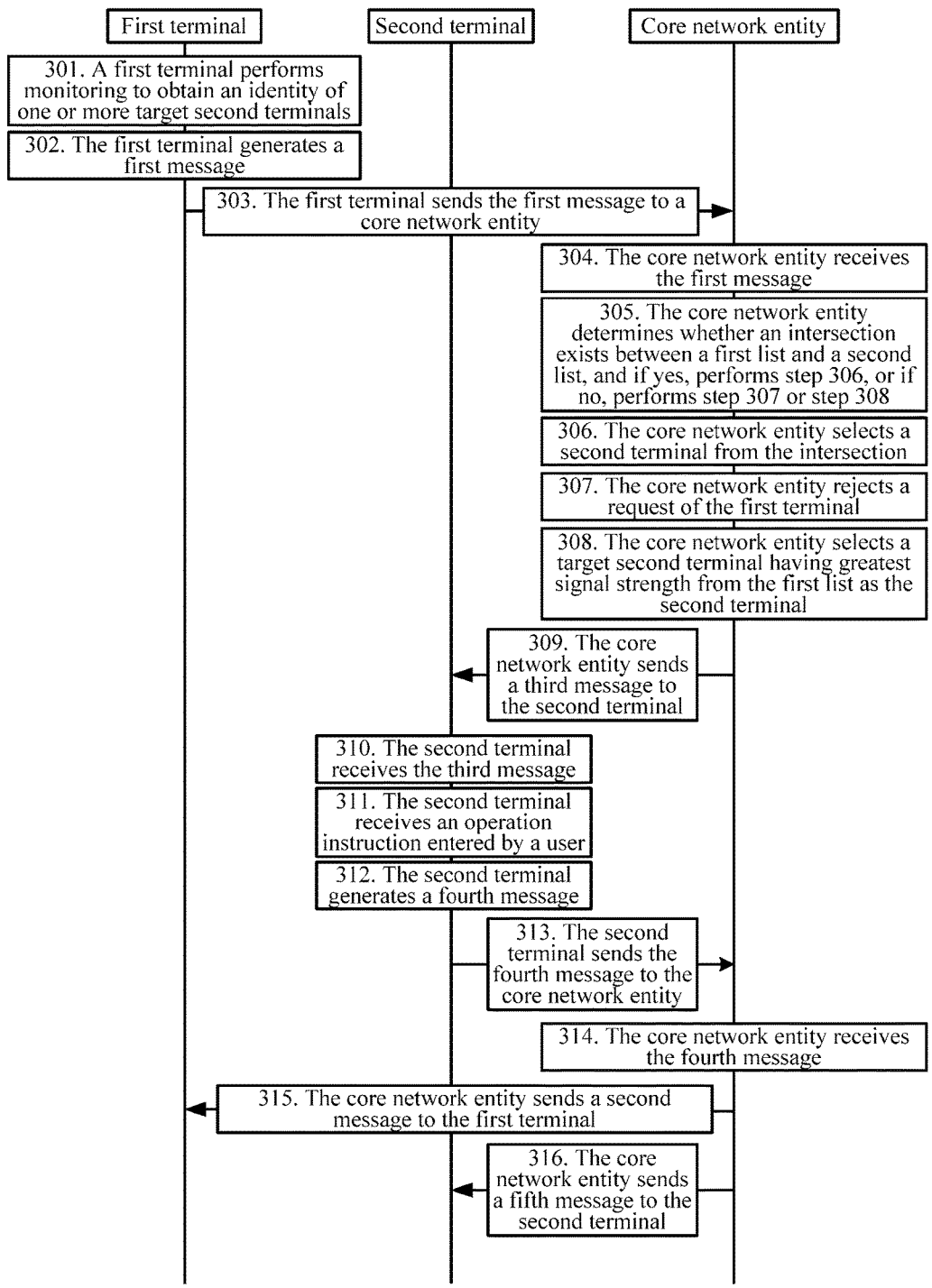
FIG. 3 is a flowchart of steps in another embodiment of a device association method according to an embodiment of the present invention.

On a basis of FIG. 1 and FIG. 2, with reference to FIG. 3, the following describes how the first terminal establishes an association relationship with the second terminal if the first message is sent by the first terminal.

It should be clarified that, before this embodiment is performed, the first terminal needs to satisfy a preset requirement.

The preset requirement is that the first terminal has accessed the core network entity and that the first terminal has established an EPS bearer with the network.

301. The first terminal performs monitoring to obtain an identity of one or more target second terminals.

Specifically, the target second terminal is a terminal near the first terminal.

The first terminal performs monitoring to obtain an identity of a target second terminal that is near the first terminal and satisfies an access condition.

In this embodiment, the target second terminal that satisfies the access condition may be: the target second terminal performs broadcast, and broadcast content may be that the target second terminal can perform forwarding for the first terminal, so that the first terminal can associate with the core network entity by using the target second terminal, and the target second terminal is a terminal that is monitored by the first terminal and whose signal strength is greater than a preset value.

In this embodiment, the preset value is not limited, and may be set by the first terminal according to different application scenarios.

302. The first terminal generates the first message.

The first message includes a first list.

The first list includes the identity of the one or more target second terminals monitored by the first terminal.

In this embodiment, the identity of the target second terminal is not limited, so long as the target second terminal uniquely corresponds to the identity of the target second terminal.

For example, in this embodiment, the identity of the target second terminal may be an identity used for broadcasting on a target air interface by the target second terminal, or a GUTI of the target second terminal, or a MSISDN of the target second terminal, or an IMEI of the target second terminal, and the target air interface is an air interface of a direct channel between the first terminal and the second terminal.

Optionally, the first list further includes the identity of the one or more target second terminals and corresponding signal strength of each target second terminal.

303. The first terminal sends the first message to the core network entity.

304. The core network entity receives the first message.

305. The core network entity determines whether an intersection exists between the first list and a second list, and if yes, performs step 306, or if no, performs step 307 or step 308.

Specifically, the core network entity saves subscription information of a user, and the subscription information includes the second list.

More specifically, the second list includes an identity of one or more second terminals allowed to associate with the first terminal.

If the core network entity determines that an identity of a target second terminal included in the first list reported by the first terminal is also included in the second list, the core network entity may determine that the target second terminal in the intersection of the first list and the second list can associate with the first terminal.

Optionally, the second list saved by the core network entity includes an international mobile subscriber identity (IMSI) of the one or more second terminals allowed to associate with the first terminal.

If an identity of a target second terminal reported by the first terminal is an identity used for broadcasting on a target air interface by the target second terminal, or a GUTI of the target second terminal, or a MSISDN of the target second terminal, or an IMEI of the target second terminal, the core network entity obtains an IMSI of the target second terminal according to the identity of the target second terminal. Further, if the obtained IMSI of the target second terminal is also included in the second list, it indicates that the target second terminal is a terminal that can associate with the first terminal.

306. The core network entity selects the second terminal from the intersection.

In this embodiment, a specific manner of selecting the second terminal from the intersection by the core network entity may be:

selecting, by the core network entity, a target second terminal having greatest signal strength from the intersection as the second terminal, where the first list includes the identity of the one or more target second terminals and corresponding signal strength of each target second terminal.

Specifically, if there are more than two target second terminals in the intersection, the core network entity selects a target second terminal having greatest signal strength from the intersection as the second terminal.

If there is one target second terminal in the intersection, the core network entity determines that the target second terminal is the second terminal.

After step 306 is performed, step 315 and step 316 may be performed, so that the first terminal establishes an association relationship with the second terminal.

307. The core network entity rejects a request of the first terminal.

When the core network entity determines that no intersection exists between the first list and the second list, the core network entity may reject an association request that is sent by the first terminal by using the first message, and refuse the first terminal to connect to the network by using the second terminal.

308. The core network entity selects a target second terminal having greatest signal strength from the first list as the second terminal.

When the core network entity determines that no intersection exists between the first list and the second list, the core network entity does not reject the association request that is sent by the first terminal by using the first message, but selects the target second terminal having greatest signal strength from the first list as the second terminal.

309. The core network entity sends a third message to the second terminal.

The third message is used to request the second terminal to determine whether the first terminal is allowed to associate with the second terminal.

It should be noted that, in the process of performing step 309, the core network entity needs to determine that the second terminal is connected to the core network entity. If the second terminal is disconnected from the core network entity, a connection needs to be established between the core network entity and the second terminal.

Specifically, how to establish a connection between the core network entity and the second terminal pertains to the prior art, and is not described in this embodiment.

310. The second terminal receives the third message.

311. The second terminal receives an operation instruction entered by a user.

Specifically, the second terminal may prompt a dialog box to the user according to the third message. The user may enter the operation instruction in the dialog box. By entering the operation instruction, the user instructs whether to allow the first terminal to associate with the second terminal.

312. The second terminal generates a fourth message.

Specifically, the second terminal generates the fourth message according to the operation instruction entered by the user.

More specifically, the fourth message includes a determining result of the second terminal.

The second terminal uses the determining result to indicate to the user whether the first terminal is allowed to associate with the second terminal.

313. The second terminal sends the fourth message to the core network entity.

314. The core network entity receives the fourth message.

The core network entity can determine, according to the determining result, whether the first terminal is allowed to associate with the second terminal.

The core network entity continues to perform step 315 if the core network entity determines, according to the fourth message, that the user instructs to allow the first terminal to associate with the second terminal.

315. The core network entity sends the second message to the first terminal.

The second message includes an identity of the second terminal.

316. The core network entity sends a fifth message to the second terminal.

The fifth message includes an identity of the first terminal.

The first terminal and the second terminal establish an association according to the second message and the fifth message, so that the first terminal can connect to the network by using the second terminal.

Optionally, to ensure security of a transmission channel, the second message shown in step 315 may further include a target key, and the fifth message shown in step 316 may further include the target key.

The target key is a key on the air interface of the direct channel between the first terminal and the second terminal. The security of the transmission channel can be effectively ensured by using the target key.

Apparently, by using the device association method shown in this embodiment, the core network entity can select, according to a first message that includes a first list and is reported by the first terminal, a second terminal allowed to associate with the first terminal. Therefore, the first terminal can access the core network entity by using the second terminal, a combination is formed between the first terminal and the second terminal, power consumption of the first terminal is reduced effectively, and data transmission efficiency of the first terminal is improved. In addition, the device association method shown in this embodiment can enhance security of a transmission channel, and prevent a third party from obtaining data.

Figure 4:
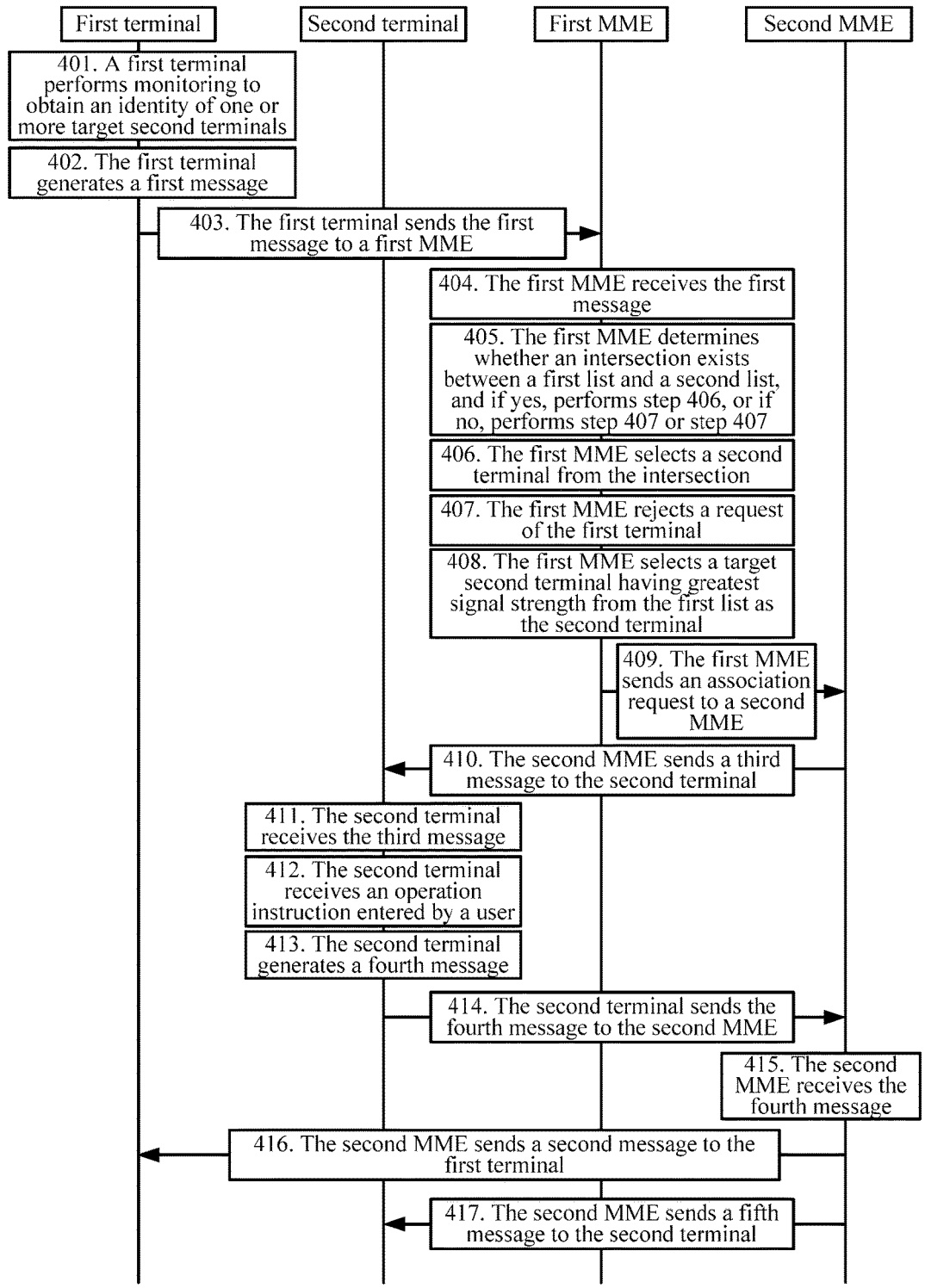
FIG. 4 is a flowchart of steps in another embodiment of a device association method according to an embodiment of the present invention.

On a basis of FIG. 3, with reference to a specific application scenario shown in FIG. 4, the following describes the device association method by using an example.

In the description of this application scenario, it is assumed that the core network entity is a MME, and a specific quantity of the MMEs used to implement the device association method shown in this application scenario is not limited, that is, the quantity of the MMEs may be one or more.

In the description of this application scenario, it is assumed that the quantity of the MMEs used to implement the device association method is two, including a first MME configured to serve the first terminal, and a second MME configured to serve the second terminal.

401. The first terminal performs monitoring to obtain an identity of one or more target second terminals.

402. The first terminal generates the first message.

For a specific implementation process of step 401 and step 402 in this embodiment, refer to step 301 and step 302 shown in FIG. 3. Details are not described again in this application scenario.

403. The first terminal sends the first message to the first MME.

404. The first MME receives the first message.

405. The first MME determines whether an intersection exists between the first list and a second list, and if yes, performs step 406, or if no, performs step 407 or step 408.

406. The first MME selects the second terminal from the intersection.

For a specific implementation process of step 403 to step 406 performed by the first MME in this embodiment, refer to step 303 to step 306 performed by the core network entity shown in FIG. 3. The specific process is not described again in this embodiment.

407. The first MME rejects a request of the first terminal.

408. The first MME selects a target second terminal having greatest signal strength from the first list as the second terminal.

In this application scenario, after step 406 or step 408 is performed, the first MME performs step 409.

409. The first MME sends an association request to the second MME.

In this embodiment, the association request includes an association indication sent by the first MME.

If step 407 is performed, the association indication is that the first terminal is allowed to associate with the second terminal. If step 408 is performed, the association indication is that whether the first terminal is allowed to associate with the second terminal is not determined. Therefore, the association indication used to indicate that whether the first terminal is allowed to associate with the second terminal is not determined can trigger the second terminal to perform further determining.

If the association indication indicates that whether the first terminal is allowed to associate with the second terminal is not determined, the second MME performs step 410.

If the association indication is that the first terminal is allowed to associate with the second terminal, step 416 and step 417 are performed.

410. The second MME sends a third message to the second terminal.

For a specific process of step 411 performed by the second MME, refer to the specific process of step 309 performed by the core network entity shown in FIG. 3. Details are not described again in this step.

411. The second terminal receives the third message.

412. The second terminal receives an operation instruction entered by a user.

413. The second terminal generates a fourth message.

414. The second terminal sends the fourth message to the second MME.

For a specific process of step 411 to step 414 in this application scenario, refer to step 310 to step 313 in FIG. 3. Details are not described again.

415. The second MME receives the fourth message.

416. The second MME sends the second message to the first terminal.

417. The second MME sends a fifth message to the second terminal.

For a specific process of step 415 to step 417 performed by the second MME, refer to step 314 to step 316 performed by the core network entity shown in FIG. 3. Details are not described again in this embodiment.

Figure 5:
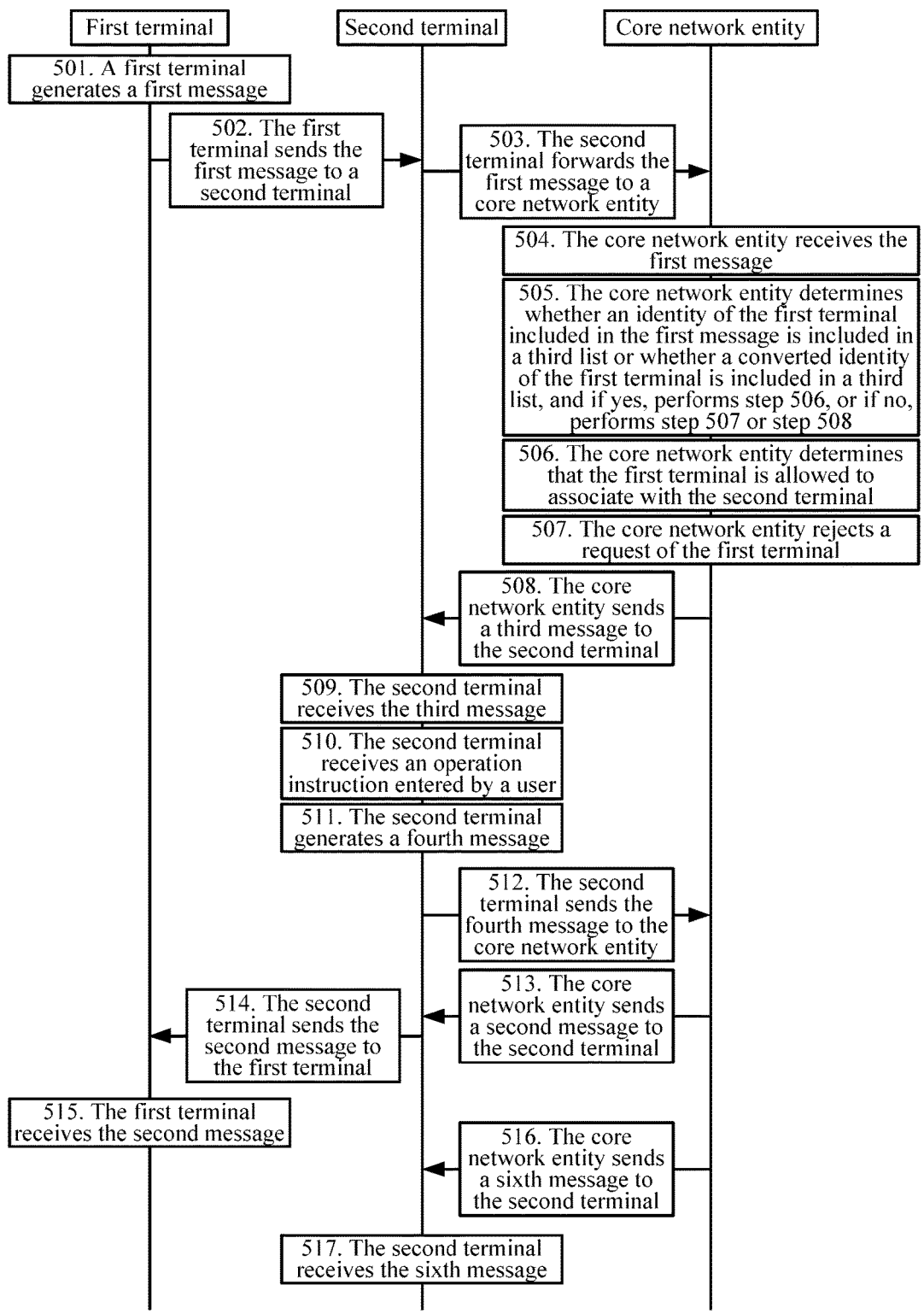
FIG. 5 is a flowchart of steps in another embodiment of a device association method according to an embodiment of the present invention.

On a basis of FIG. 1 and FIG. 2, with reference to FIG. 5, the following describes another method for establishing an association relationship with the second terminal by the first terminal if the first message is sent by the first terminal.

501. The first terminal generates a first message.

The first message includes an identity of the first terminal.

In this embodiment, the identity of the first terminal is not limited, so long as the identity of the first terminal uniquely corresponds to the first terminal.

In this embodiment, the identity of the first terminal may be an IMEI of the first terminal, or a MSISDN of the first terminal, or an ISDN of the first terminal, or a GUTI of the first terminal, or an IMPU of the first terminal, or a random number.

502. The first terminal sends the first message to the second terminal.

In this embodiment, a criterion based on which the first terminal selects the second terminal is not limited, so long as the first terminal can perform data communication with the core network entity by using the second terminal.

Optionally, the first terminal may select a terminal that is near the first terminal and whose signal strength is greatest as the second terminal.

Specifically, the first terminal sends the first message to the second terminal through an air interface of a direct channel between the first terminal and the second terminal.

The first message herein may be a non-access stratum (NAS) tracking area update (TAU) message sent by the first terminal.

503. The second terminal forwards the first message to the core network entity.

504. The core network entity receives the first message.

505. The core network entity determines whether an identity of the first terminal included in the first message is included in a third list or whether a converted identity of the first terminal is included in a third list, and if yes, performs step 506, or if no, performs step 507 or step 508.

The core network entity includes the third list, and the third list includes an identity of one or more first terminals allowed to associate with the second terminal.

Optionally, the third list saved by the core network entity includes an IMSI of the one or more first terminals allowed to associate with the second terminal.

Optionally, that the core network entity determines, according to the identity of the first terminal, whether the converted identity of the first terminal is included in a third list, specifically includes: the core network entity determines an IMSI of the first terminal according to the identity of the first terminal, and determines whether the IMSI of the first terminal is included in the third list.

More specifically, if the core network entity determines that the identity of the first terminal included in the first message is not the IMSI of the first terminal, the core network entity converts the identity of the first terminal, so that the converted identity of the first terminal is the IMSI of the first terminal.

That is, a type of the identity of the first terminal included in the first message is consistent with that of the identity of the first terminal included in the third list.

506. The core network entity determines that the first terminal is allowed to associate with the second terminal.

If the core network entity determines that the identity of the first terminal is included in the third list or that the converted identity of the first terminal is included in the third list, it indicates that the first terminal can establish an association with the second terminal. In this case, step 512 continues to be performed.

If the core network entity determines that the identity of the first terminal is not included in the third list or that the converted identity of the first terminal is not included in the third list, it indicates that the core network entity does not determine whether the first terminal establishes a relationship with the second terminal. In this case, the core network entity may continue to perform step 507 or step 508.

507. The core network entity rejects a request of the first terminal.

When the core network entity determines that the identity of the first terminal is not included in the third list or that the converted identity of the first terminal is not included in the third list, the core network entity may refuse the first terminal to connect to the network by using the second terminal.

Optionally, in this embodiment, the core network entity may prestore a denied access list. If the core network entity determines to reject the request of the first terminal according to the first message including the identity of the first terminal, the core network entity may store the identity of the first terminal in the denied access list, so that when the core network entity receives the identity of the first terminal again, the core network entity may directly reject an access request of the first terminal according to the denied access list.

508. The core network entity sends a third message to the second terminal.

509. The second terminal receives the third message.

510. The second terminal receives an operation instruction entered by a user.

511. The second terminal generates a fourth message.

512. The second terminal sends the fourth message to the core network entity.

For a specific implementation process of step 507 to step 512 in this embodiment, refer to step 309 to step 313 shown in FIG. 3. Details are not described again in this embodiment.

If the fourth message includes an indication used to indicate that the first terminal is allowed to associate with the second terminal, step 513 continues to be performed.

513. The core network entity sends a second message to the second terminal.

The second message includes indication information used to indicate that the first terminal is allowed to associate with the second terminal.

514. The second terminal sends the second message to the first terminal.

515. The first terminal receives the second message.

516. The core network entity sends a sixth message to the second terminal.

The sixth message includes the indication information used to indicate that the first terminal is allowed to associate with the second terminal.

It should be clarified that, there is no execution time sequence between step 513 and step 516. This embodiment is merely an example, and there is no limitation in this regard.

517. The second terminal receives the sixth message.

The first terminal and the second terminal establish an association according to the second message and the sixth message, so that the first terminal can connect to the network by using the second terminal.

Optionally, to ensure security of a transmission channel, the second message shown in step 514 may further include a target key, and the sixth message shown in step 516 may further include the target key.

The target key is a key on the air interface of the direct channel between the first terminal and the second terminal. The security of the transmission channel can be effectively ensured by using the target key.

Apparently, by using the device association method shown in this embodiment, the core network entity can determine, according to a first message that includes an identity of the first terminal and is reported by the first terminal, whether the second terminal is allowed to associate with the first terminal. Therefore, the first terminal can access the core network entity by using the second terminal, a combination is formed between the first terminal and the second terminal, power consumption of the first terminal is reduced effectively, and data transmission efficiency of the first terminal is improved. In addition, the device association method shown in this embodiment can enhance security of a transmission channel, and prevent a third party from obtaining data.

Figure 6:
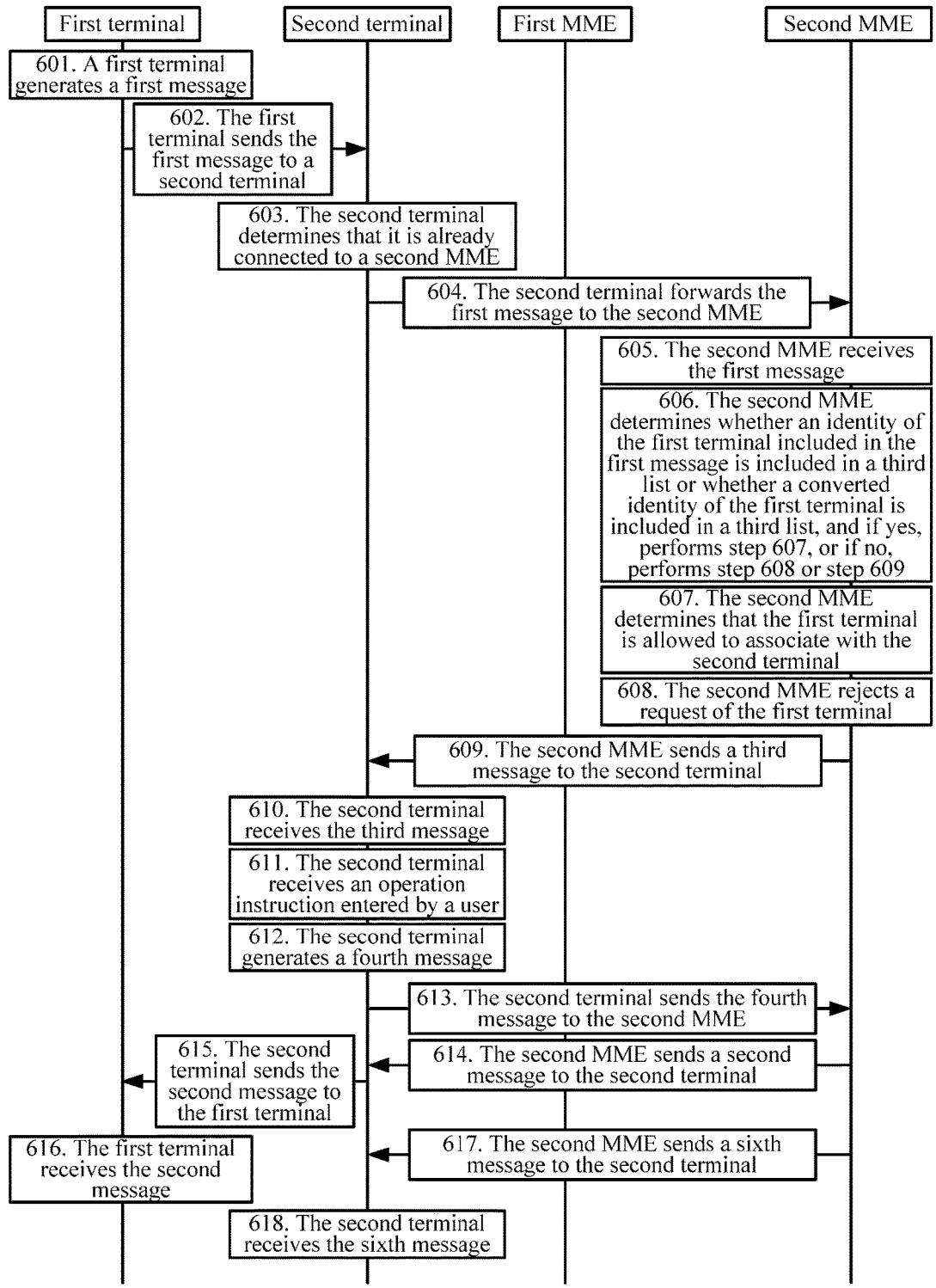
FIG. 6 is a flowchart of steps in another embodiment of a device association method according to an embodiment of the present invention.

On a basis of FIG. 5, with reference to a specific application scenario shown in FIG. 6, the following describes the device association method by using an example.

In the description of this application scenario, it is assumed that the core network entity is a MME, and a specific quantity of the MMEs used to implement the device association method shown in this embodiment is not limited, that is, the quantity of the MMEs may be one or more.

In the description of this embodiment, it is assumed that the quantity of the MMEs used to implement the device association method is two, including a first MME configured to serve the first terminal, and a second MME configured to serve the second terminal.

601. The first terminal generates a first message.

602. The first terminal sends the first message to the second terminal.

603. The second terminal determines that it is already connected to the second MME.

Specifically, if the second terminal is in an idle state, the second terminal enters a connected state by using a service request message. If the second terminal is already in the connected state, step 604 continues to be performed.

604. The second terminal forwards the first message to the second MME.

605. The second MME receives the first message.

In this embodiment, the first message may be a TAU message, a service request, or a new NAS message, so long as the first message includes an identity of the first terminal.

606. The second MME determines whether an identity of the first terminal included in the first message is included in a third list or whether a converted identity of the first terminal is included in a third list, and if yes, performs step 607, or if no, performs step 608 or step 609.

607. The second MME determines that the first terminal is allowed to associate with the second terminal.

608. The second MME rejects a request of the first terminal.

609. The second MME sends a third message to the second terminal.

610. The second terminal receives the third message.

611. The second terminal receives an operation instruction entered by a user.

612. The second terminal generates a fourth message.

613. The second terminal sends the fourth message to the second MME.

614. The second MME sends a second message to the second terminal.

615. The second terminal sends the second message to the first terminal.

616. The first terminal receives the second message.

617. The second MME sends a sixth message to the second terminal.

618. The second terminal receives the sixth message.

For a specific process of step 606 to step 618 performed by the second MME in this application scenario, refer to step 505 to step 517 performed by the core network entity in FIG. 5. Details are not described again in this application scenario.

The following describes how the first terminal establishes an association relationship with the second terminal if the first message is sent by the second terminal.

The second terminal sends a first message to the core network entity.

In this embodiment, when the core network entity determines, according to the first message, that the first terminal is allowed to associate with the second terminal, the core network entity generates a second message.

The second message is used to establish an association between the first terminal and the second terminal, so that the first terminal can connect to the network by using the second terminal.

Apparently, by using the device association method shown in this embodiment, the second terminal can send the first message to the core network entity, and further, under control of the core network entity, an association relationship between the first terminal and the second terminal can be implemented. Therefore, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

Figure 7:
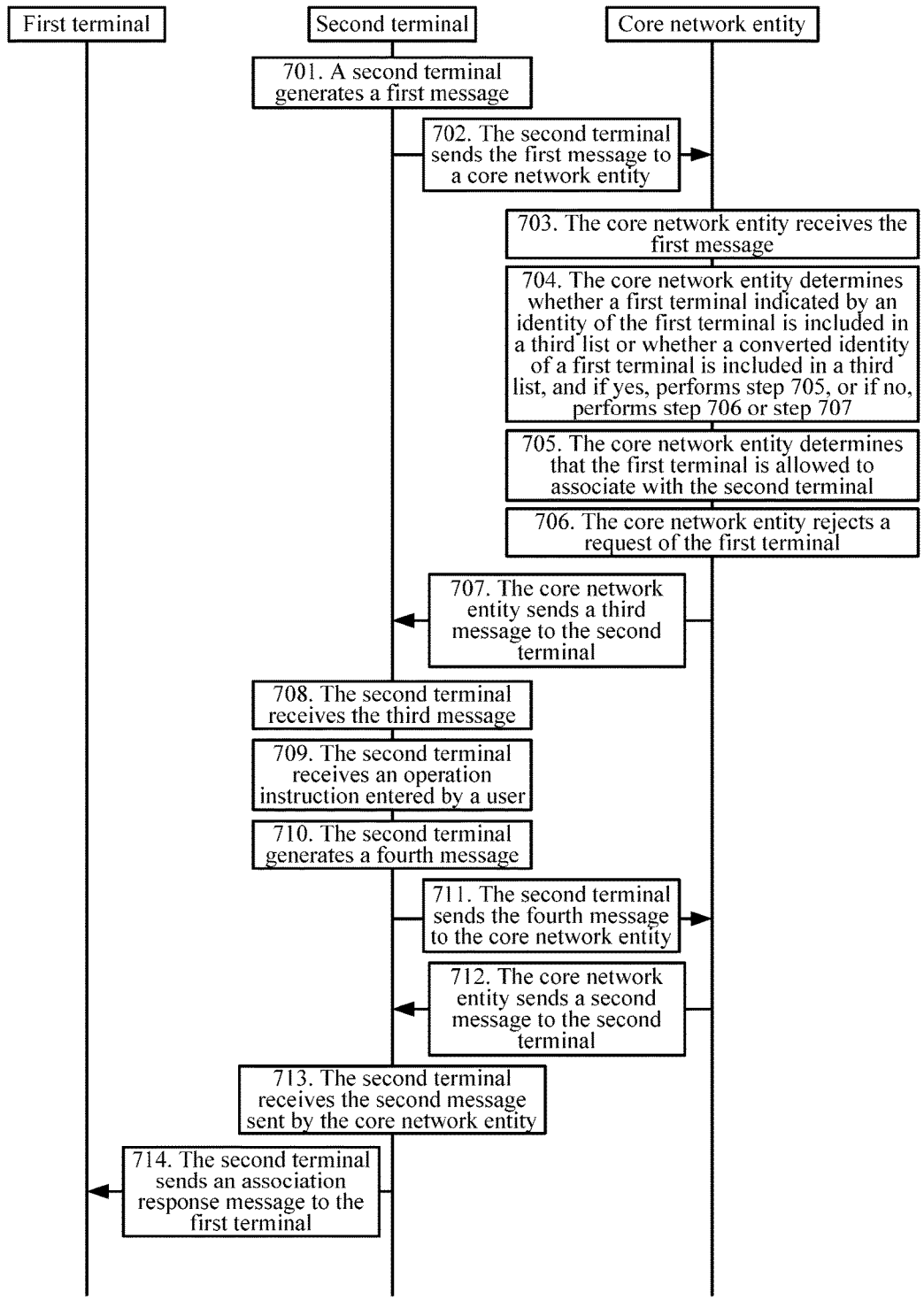
FIG. 7 is a flowchart of steps in another embodiment of a device association method according to an embodiment of the present invention.

With reference to FIG. 7, the following describes how the first terminal establishes an association relationship with the second terminal if the first message is sent by the second terminal.

701. The second terminal generates the first message.

The first message includes an identity of the first terminal.

In this embodiment, the identity of the first terminal is not limited, so long as the identity of the first terminal uniquely corresponds to the first terminal.

In this embodiment, the identity of the first terminal may be an IMEI of the first terminal, or a MSISDN of the first terminal, or an ISDN of the first terminal, or a GUTI of the first terminal, or an IMPU of the first terminal, or a random number.

702. The second terminal sends the first message to the core network entity.

703. The core network entity receives the first message.

704. The core network entity determines whether an identity of the first terminal included in the first message is included in a third list or whether a converted identity of the first terminal is included in a third list, and if yes, performs step 705, or if no, performs step 706 or step 707.

The core network entity includes the third list, and the third list includes an identity of one or more first terminals allowed to associate with the second terminal.

For a detailed description of the third list in this embodiment, refer to step 505 shown in FIG. 5. Details are not described again in this embodiment.

705. The core network entity determines that the first terminal is allowed to associate with the second terminal.

If the core network entity determines that the identity of the first terminal is included in the third list or that the converted identity of the first terminal is included in the third list, it indicates that the first terminal can establish an association with the second terminal. In this case, step 711 continues to be performed.

If the core network entity determines that the identity of the first terminal is not included in the third list or that the converted identity of the first terminal is not included in the third list, it indicates that the core network entity does not determine whether the first terminal establishes a relationship with the second terminal. In this case, the core network entity continues to perform step 706 or step 707.

706. The core network entity rejects a request of the first terminal.

707. The core network entity sends a third message to the second terminal.

708. The second terminal receives the third message.

709. The second terminal receives an operation instruction entered by a user.

710. The second terminal generates a fourth message.

711. The second terminal sends the fourth message to the core network entity.

For a specific implementation process of step 706 to step 711 in this embodiment, refer to step 309 to step 313 shown in FIG. 3. Details are not described again in this embodiment.

If the fourth message includes an indication used to indicate that the first terminal is allowed to associate with the second terminal, step 712 continues to be performed.

712. The core network entity sends a second message to the second terminal.

The second message includes indication information used to indicate that the first terminal is allowed to associate with the second terminal.

713. The second terminal receives the second message sent by the core network entity.

The second message includes the indication information used to indicate that the first terminal is allowed to associate with the second terminal.

714. The second terminal sends an association response message to the first terminal.

The second terminal sends the association response message to the first terminal according to the second message, so that the first terminal establishes an association with the second terminal and that the first terminal can connect to the network by using the second terminal.

Specifically, the second terminal sends the association response message to the first terminal according to the identity of the first terminal.

Step 711 and step 714 show how the first terminal establishes an association relationship with the second terminal. It should be clarified that, step 711 and step 714 are merely an example, and are not limited.

For example, the process of establishing an association between the first terminal and the second terminal may be further implemented by the following steps.

The core network entity sends the second message to the first terminal.

The second message includes indication information used to indicate that the first terminal is allowed to associate with the second terminal, and a target key. The target key is a key on an air interface of a direct channel between the first terminal and the second terminal.

The second terminal sends the target key to the first terminal.

Specifically, the target key may be carried in the association response message.

The first terminal establishes the association with the second terminal according to the indication information and the target key.

Apparently, by using the device association method shown in this embodiment, the core network entity can determine, according to the first message that includes an identity of the first terminal and is reported by the second terminal, that the first terminal is allowed to associate with the second terminal. When the core network entity determines, according to the first message, that the first terminal can associate with the second terminal, the first terminal can access the core network entity by using the second terminal, a combination is formed between the first terminal and the second terminal, power consumption of the first terminal is reduced effectively, and data transmission efficiency of the first terminal is improved. In addition, the device association method shown in this embodiment can enhance security of a transmission channel, and prevent a third party from obtaining data.

Figure 8:
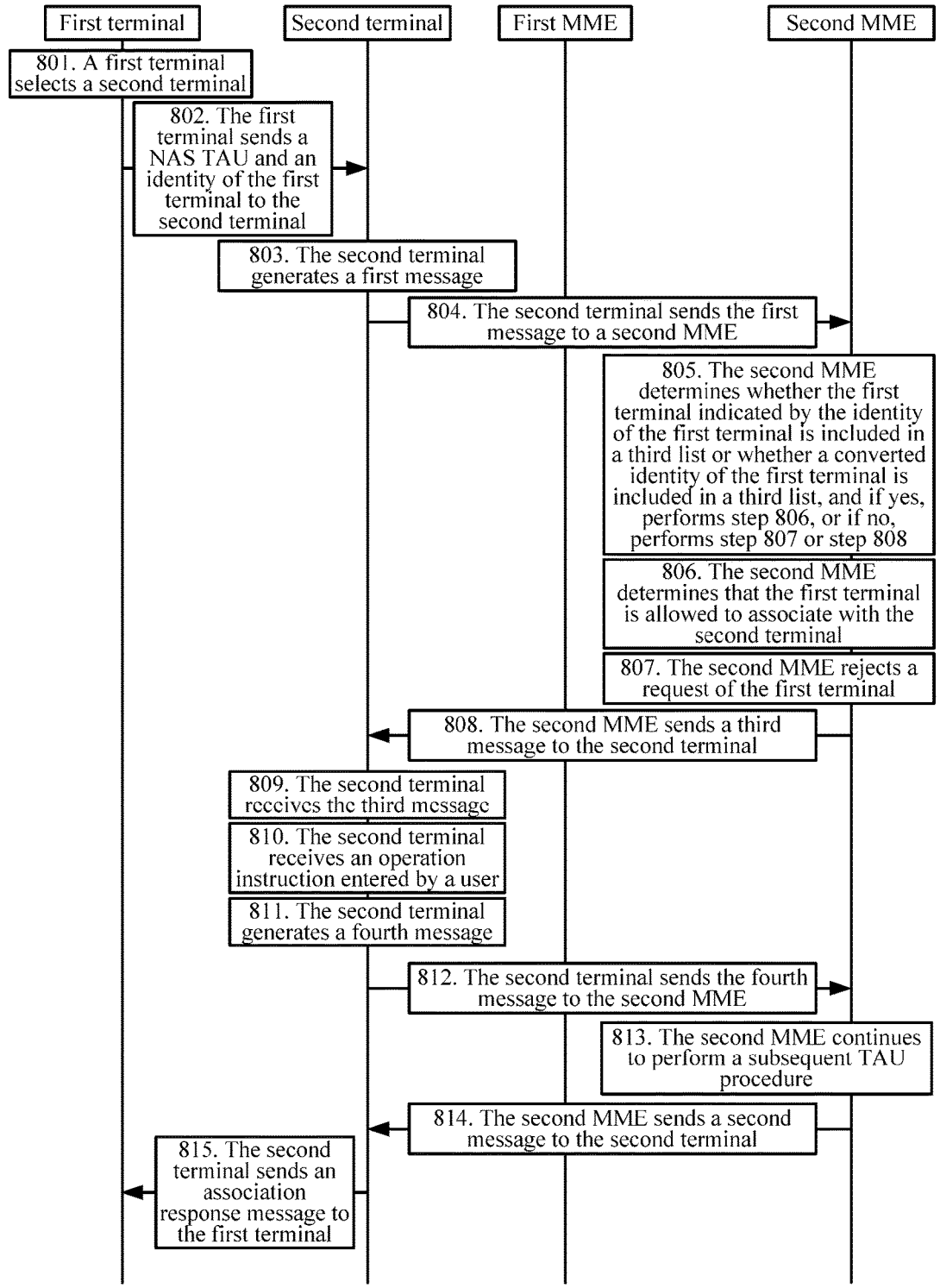
FIG. 8 is a flowchart of steps in another embodiment of a device association method according to an embodiment of the present invention.

On a basis of FIG. 7, with reference to a specific application scenario shown in FIG. 8, the following describes the device association method by using an example.

In the description of this application scenario, it is assumed that the core network entity is a MME, and a specific quantity of the MMEs used to implement the device association method shown in this embodiment is not limited, that is, the quantity of the MMEs may be one or more.

In the description of this embodiment, it is assumed that the quantity of the MMEs used to implement the device association method is two, including a first MME configured to serve the first terminal, and a second MME configured to serve the second terminal.

In addition, in this application scenario, the device association method is implemented in a TA TAU update procedure of the first terminal. It should be clarified that, this application scenario is merely an example, and is not limited.

801. The first terminal selects a second terminal.

Specifically, the first terminal may select a terminal that is near the first terminal and whose signal strength is greatest as the second terminal.

802. The first terminal sends a NAS TAU and an identity of the first terminal to the second terminal.

In this application scenario, the NAS TAU and the identity of the first terminal may be mutually independent messages. The identity of the first terminal may also be carried in the NAS TAU. Specifically, this is not limited in this application scenario.

803. The second terminal generates the first message.

In this application scenario, the first message may be a NAS message.

Specifically, the second terminal receives the NAS TAU message and the identity of the first terminal from an air interface of a direct channel between the first terminal and the second terminal, and the second terminal encapsulates the NAS TAU message and the identity of the first terminal into the NAS message to generate the first message.

Specifically, the first message may reuse existing UPLINK GENERIC NAS TRANSPORT and DOWNLINK GENERIC NAS TRANSPORT messages, and a new generic message container type is defined to indicate that content of a generic message container is a NAS message of the first terminal, for example, UPLINK WD NAS TRANSPORT and DOWNLINK WD NAS TRANSPORT.

The description of the first message in this application scenario is an example, and is not limited, so long as the first message includes the identity of the first terminal.

804. The second terminal sends the first message to the second MME.

805. The second MME determines whether the identity of the first terminal included in the first message is included in a third list or whether a converted identity of the first terminal is included in a third list, and if yes, performs step 806, or if no, performs step 807 or step 808.

The second MME includes the third list, and the third list includes an identity of one or more first terminals allowed to associate with the second terminal.

For a detailed description of the third list in this embodiment, refer to step 505 shown in FIG. 5. Details are not described again in this embodiment.

806. The second MME determines that the first terminal is allowed to associate with the second terminal.

If the second MME determines that the identity of the first terminal is included in the third list or that the converted identity of the first terminal is included in the third list, it indicates that the first terminal can establish an association with the second terminal. In this case, step 814 continues to be performed.

If the second MME determines that the identity of the first message is not included in the third list or that the converted identity of the first terminal is not included in the third list, it indicates that the second MME does not determine whether the first terminal establishes a relationship with the second terminal. In this case, the second MME may continue to perform step 807 or step 808.

807. The second MME rejects a request of the first terminal.

808. The second MME sends a third message to the second terminal.

In this application scenario, the third message may be a NAS message.

809. The second terminal receives the third message.

810. The second terminal receives an operation instruction entered by a user.

811. The second terminal generates a fourth message.

812. The second terminal sends the fourth message to the second MME.

For a specific implementation process of step 807 to step 812 in this embodiment, refer to step 309 to step 313 shown in FIG. 3. Details are not described again in this embodiment.

If the fourth message includes an indication used to indicate that the first terminal is allowed to associate with the second terminal, step 813 continues to be performed.

813. The second MME continues to perform a subsequent TAU procedure.

The specific TAU procedure performed by the second MME is a procedure in the prior art. Details are not described in this application scenario.

814. The second MME sends a second message to the second terminal.

The second message may include the identity of the first terminal.

Optionally, the second message may further include a target key. The target key is a key on the air interface of the direct channel between the first terminal and the second terminal.

815. The second terminal sends an association response message to the first terminal.

Specifically, the second message is a TAU accept message sent by the second MME.

Optionally, the second message may further include the target key.

The target key may be in the TAU accept message, or may be a field parallel to the TAU accept.

The second MME sends the TAU accept message and the target key to the second terminal by using a NAS message, so that the second terminal can send the association response message carrying the target key to the first terminal.

The second message includes the identity of the first terminal. The second MME sends the second message to the second terminal, so that the second terminal can send, according to the identity of the first terminal in the second message, the TAU accept that the second MME needs to send to the second terminal, to the first terminal through the air interface between the first terminal and the second terminal.

Optionally, if the second MME determines that the first terminal and the second terminal can establish an association, the second MME saves an allowed access list in a context of the second terminal, and the second MME stores the identity of the first terminal in the allowed access list.

Optionally, when the second MME needs to send an update location message to an HSS to update the context of the second terminal, the updated allowed access list may be sent to the HSS for storage.

Optionally, if the second MME determines that the user does not instruct whether to allow the first terminal to associate with the second terminal or that the user selects not to allow the first terminal to associate with the second terminal, the second MME sends a TAU reject message to the first terminal by using the second terminal, where a cause is that the second terminal denies access, and the identity of the first terminal not allowed to access the network is saved in the context of the second terminal.

In the foregoing embodiments, the core network entity determines the second terminal that can associate with the first terminal. With reference to an embodiment shown in FIG. 9, the following describes a device association method how the second terminal determines whether the second terminal can associate with the first terminal.

901. A second terminal receives a seventh message sent by a first terminal.

In this embodiment, the seventh message is not limited, so long as the first terminal can use the seventh message to trigger the second terminal to determine whether the first terminal can associate with the second terminal.

902. The second terminal determines, according to the seventh message and a third list, whether the first terminal is allowed to associate with the second terminal.

The third list includes an identity of one or more first terminals allowed to associate with the second terminal.

Apparently, by using the device association method shown in this embodiment, the second terminal can determine, according to the third list and the seventh message sent by the first terminal, whether the first terminal is allowed to associate with the second terminal. Therefore, determining by a core network entity is not required, and efficiency of data transmission between the first terminal and the core network entity is improved effectively.

Figure 10:
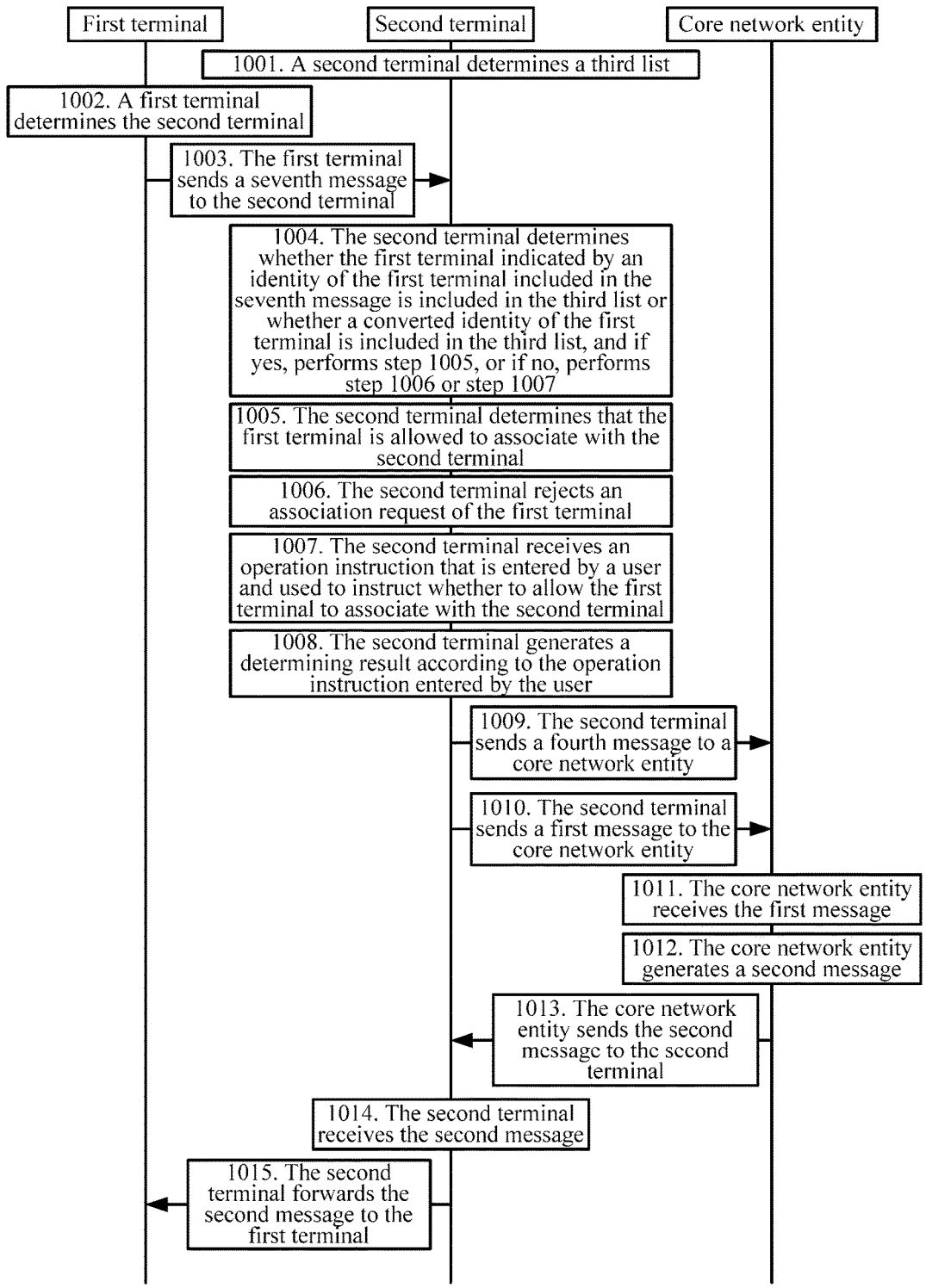
FIG. 10 is a flowchart of steps in another embodiment of a device association method according to an embodiment of the present invention.

With reference to an embodiment shown in FIG. 10, the following describes a device association method in which the second terminal determines whether the second terminal can associate with the first terminal.

1001. The second terminal determines the third list.

The third list shown in this embodiment includes an identity of one or more first terminals allowed to associate with the second terminal.

Specifically, the third list may be pre-stored by the second terminal, that is, the second terminal saves the third list locally.

More specifically, the third list saves an identity of a first terminal that a user manually pairs with the second terminal to perform an association, or an identity of a first terminal previously associated with the second terminal.

Optionally, the third list shown in this embodiment may be sent by a core network entity, that is, before performing step 1001, the second terminal may further perform a step of receiving the third list sent by the core network entity.

Specifically, the core network entity may send the third list to the second terminal in an attach or TAU procedure.

More specifically, in this embodiment, the identity of the first terminal included in the third list is not limited, so long as the first terminal uniquely corresponds to the identity of the first terminal.

For example, the identity of the first terminal may be an IMEI of the first terminal, or a MSISDN of the first terminal, or an ISDN of the first terminal, or a GUTI of the first terminal, or an IMPU of the first terminal.

1002. The first terminal determines the second terminal.

The first terminal may monitor its surrounding to obtain a second terminal that is near the first terminal and whose signal strength is greatest.

1003. The first terminal sends a seventh message to the second terminal.

The seventh message includes an identity of the first terminal.

Specifically, the first terminal may send the seventh message to the second terminal through an air interface between the first terminal and the second terminal.

1004. The second terminal determines whether an identity of the first terminal included in the seventh message is included in the third list or whether a converted identity of the first terminal is included in the third list, and if yes, performs step 1005, or if no, performs step 1006 or step 1007.

If the second terminal determines that the identity of the first terminal included in the seventh message is included in the third list or that the converted identity of the first terminal is included in the third list, the second terminal determines that the first terminal is allowed to associate with the second terminal, that is, step 1005 is performed.

If the second terminal determines that the identity of the first terminal included in the seventh message is not included in the third list or that the converted identity of the first terminal is not included in the third list, the second terminal does not determine whether the first terminal is allowed to associate with the second terminal. In this case, step 1006 or 1007 continues to be performed.

1005. The second terminal determines that the first terminal is allowed to associate with the second terminal.

After step 1005 is performed, step 1010 may be performed.

1006. The second terminal rejects an association request of the first terminal.

The second terminal rejects the association request of the first terminal. In this case, the first terminal cannot establish an association with the second terminal.

Optionally, a denied access list may be set on the second terminal. When the second terminal rejects the association request of the first terminal, the second terminal may store the identity of the rejected first terminal in the denied access list.

1007. The second terminal receives an operation instruction that is entered by a user and used to instruct whether to allow the first terminal to associate with the second terminal.

1008. The second terminal generates a determining result according to the operation instruction entered by the user.

1009. The second terminal sends a fourth message to the core network entity.

The fourth message includes the determining result.

The determining result is used to indicate to the user whether the first terminal is allowed to associate with the second terminal.

Specifically, if the operation instruction entered by the user allows the first terminal to associate with the second terminal, the determining result is used to indicate that the first terminal is allowed to associate with the second terminal.

If the operation instruction entered by the user does not allow the first terminal to associate with the second terminal, the determining result is used to indicate that the first terminal is not allowed to associate with the second terminal.

More specifically, if the determining result is used to indicate that the first terminal is allowed to associate with the second terminal, step low continues to be performed.

1010. The second terminal sends a first message to the core network entity.

When the second terminal determines that the first terminal associates with the second terminal, the second terminal sends the first message to the core network entity, so that the core network entity can generate, according to the first message, a second message used to establish an association between the first terminal and the second terminal.

1011. The core network entity receives the first message.

The first message is used to indicate the second terminal allowed to establish the association with the first terminal.

1012. The core network entity generates the second message.

The core network entity generates the second message including a target key. The target key is a key on an air interface of a direct channel between the first terminal and the second terminal.

1013. The core network entity sends the second message to the second terminal.

1014. The second terminal receives the second message.

1015. The second terminal forwards the second message to the first terminal.

The first terminal can establish the association with the second terminal according to the second message, so that the first terminal can connect to a network by using the second terminal.

Specifically, an identity of the second terminal is an identity used for broadcasting on a target air interface by the second terminal, or a GUTI of the second terminal, or a MSISDN of the second terminal, or an IMEI of the second terminal, and the target air interface is the air interface of the direct channel between the first terminal and the second terminal.

The identity of the first terminal is an IMEI of the first terminal, or a MSISDN of the first terminal, or an ISDN of the first terminal, or a GUTI of the first terminal, or an IMPU of the first terminal.

Figure 11:
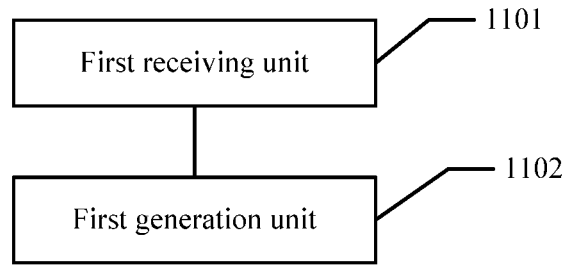
FIG. 11 is a schematic structural diagram of a core network entity according to an embodiment of the present invention.

With reference to FIG. 11, the following describes a specific structure of a core network entity used to implement the embodiment shown in FIG. 1.

The core network entity includes a first receiving unit 1101, configured to receive a first message. The core network entity also a first generation unit 1102, configured to generate a second message when it is determined, according to the first message, that a first terminal is allowed to associate with a second terminal, where the second message is used to establish an association between the first terminal and the second terminal, so that the first terminal can connect to a network by using the second terminal.

Apparently, under control of the core network entity, the core network entity shown in this embodiment can be used to implement an association relationship between the first terminal and the second terminal. Therefore, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

Figure 12:
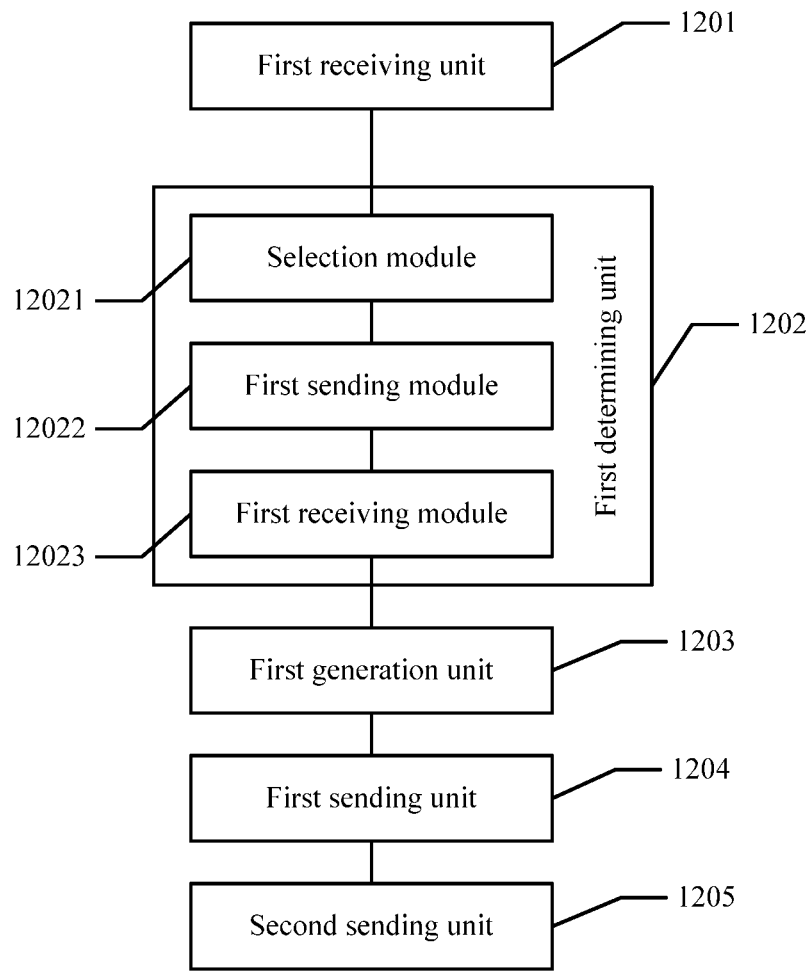
FIG. 12 is another schematic structural diagram of a core network entity according to an embodiment of the present invention.

With reference to an embodiment shown in FIG. 12, the following describes a specific structure of the core network entity if the first message is sent by the first terminal, and the core network entity shown in this embodiment is used to implement the embodiment shown in FIG. 3 or FIG. 4.

The core network entity includes a first receiving unit 1201, a first determining unit 1202, a first generation unit 1203, a first sending unit 1204, and a second sending unit 1205.

The first receiving unit 1201 receives the first message sent by the first terminal, where the first message includes a first list, the first list includes an identity of one or more target second terminals monitored by the first terminal, and the target second terminal is a terminal that is monitored by the first terminal and whose signal strength is greater than a preset value.

The first determining unit 1202 is configured to determine, according to the first list, the second terminal allowed to associate with the first terminal.

Specifically, the first determining unit 1202 is further configured to: if it is determined that an intersection exists between the first list and a second list, select the second terminal from the intersection, where the first determining unit includes the second list, and the second list includes an identity of one or more second terminals allowed to associate with the first terminal.

Specifically, the first determining unit 1202 is further configured to select a target second terminal having greatest signal strength from the intersection as the second terminal, where the first list includes the identity of the one or more target second terminals and corresponding signal strength of each target second terminal.

Specifically, the first determining unit 1202 includes a selection module 12021, configured to select a target second terminal having greatest signal strength from the first list as the second terminal, where the first list includes the identity of the one or more target second terminals and corresponding signal strength of each target second terminal. The first determining unit 1202 also includes a first sending module 12022, configured to send a third message to the second terminal, where the third message is used to request the second terminal to determine whether the first terminal is allowed to associate with the second terminal. The first determining unit 1202 further includes a first receiving module 12023, configured to receive a fourth message returned by the second terminal, where the fourth message includes a determining result of the second terminal, and the first receiving module determines, according to the determining result, whether the first terminal is allowed to associate with the second terminal.

The first generation unit 1203 is configured to generate a second message when it is determined, according to the first message, that the first terminal is allowed to associate with the second terminal, where the second message is used to establish an association between the first terminal and the second terminal.

The first sending unit 1204 is configured to send the second message to the first terminal, where the second message includes an identity of the second terminal.

The second sending unit 1205 is configured to send a fifth message to the second terminal, where the fifth message includes an identity of the first terminal, so that the first terminal and the second terminal establish the association according to the second message and the fifth message.

In this embodiment, the first sending unit 1204 and the second sending unit 1205 configured to establish the association between the first terminal and the second terminal are an example, and are not limited. For example, the units configured to establish the association between the first terminal and the second terminal may also be a third sending unit, configured to send the second message to the first terminal, where the second message includes an identity of the second terminal and a target key; and a fourth sending unit, configured to send a fifth message to the second terminal, where the fifth message includes an identity of the first terminal and the target key, and the target key is a key on an air interface of a direct channel between the first terminal and the second terminal, so that the first terminal and the second terminal establish the association according to the second message and the fifth message.

Figure 13:
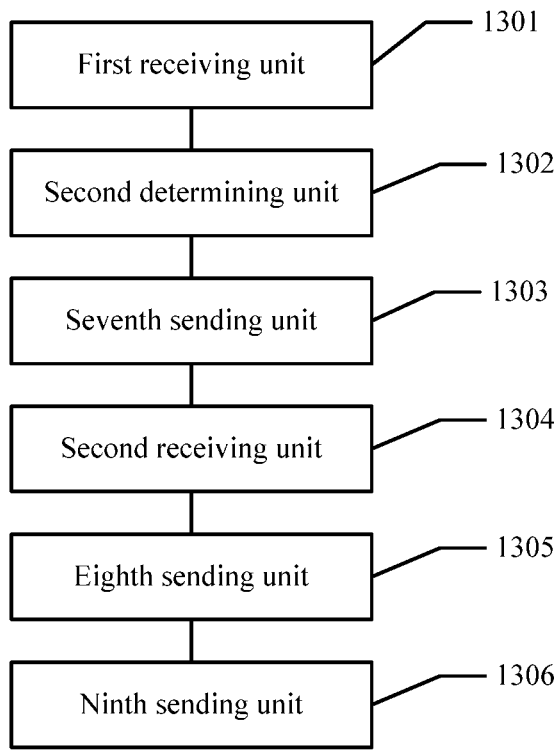
FIG. 13 is another schematic structural diagram of a core network entity according to an embodiment of the present invention.

With reference to an embodiment shown in FIG. 13, the following describes a specific structure of the core network entity if the first message is sent by the first terminal, and the core network entity shown in this embodiment is used to implement the embodiment shown in FIG. 5 or FIG. 6.

The core network entity includes a first receiving unit 1301, a second determining unit 1302, a seventh sending unit 1303, a second receiving unit 1304, an eighth sending unit 1305, and a ninth sending unit 1306.

The first receiving unit 1301 receives the first message sent by the first terminal by using the second terminal, where the first message includes an identity of the first terminal.

The first receiving unit 1301 is further configured to receive the first message sent by the first terminal by using the second terminal, where the first message includes the identity of the first terminal.

The second determining unit 1302 is configured to: if it is determined that the identity of the first terminal included in the first message is included in a third list or that a converted identity of the first terminal is included in a third list, determine that the first terminal is allowed to associate with the second terminal, where the second determining unit includes the third list, and the third list includes an identity of one or more first terminals allowed to associate with the second terminal.

The seventh sending unit 1303 is configured to send a third message to the second terminal, where the third message is used to request the second terminal to determine whether the first terminal is allowed to associate.

The second receiving unit 1304 is configured to receive a fourth message returned by the second terminal, where the fourth message includes a determining result of the second terminal, and the second receiving unit determines, according to the determining result, whether the first terminal is allowed to associate with the second terminal.

The eighth sending unit 1305 is configured to send the second message to the first terminal by using the second terminal, where the second message includes indication information used to indicate that the first terminal is allowed to associate with the second terminal.

The ninth sending unit 1306 is configured to send a sixth message to the second terminal, where the sixth message includes the indication information used to indicate that the first terminal is allowed to associate with the second terminal, so that the first terminal and the second terminal establish an association according to the second message and the sixth message.

In this embodiment, the eighth sending unit 1305 and the ninth sending unit 1306 configured to establish the association between the first terminal and the second terminal are an example, and are not limited. For example, the units configured to establish the association between the first terminal and the second terminal may also be a tenth sending unit, configured to send the second message to the first terminal by using the second terminal, where the second message includes indication information used to indicate that the first terminal is allowed to associate with the second terminal, and a target key; and an eleventh sending unit, configured to send a sixth message to the second terminal, where the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

Figure 14:
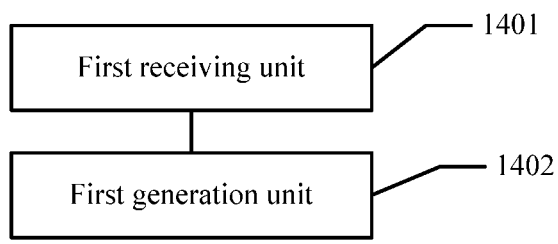
FIG. 14 is another schematic structural diagram of a core network entity according to an embodiment of the present invention.

With reference to an embodiment shown in FIG. 14, the following describes a specific structure of the core network entity if the first message is sent by the second terminal.

The core network entity includes a first receiving unit 1401, configured to receive the first message sent by the second terminal, where the first message includes an identity of the first terminal. The core network entity also includes a first generation unit 1402, configured to: if the first generation unit determines that the identity of the first terminal included in the first message is included in a third list or that a converted identity of the first terminal is included in a third list, determine, by the first generation unit, that the first terminal is allowed to associate with the second terminal, where the first generation unit includes the third list, and the third list includes an identity of one or more first terminals allowed to associate with the second terminal.

Apparently, by using the core network entity shown in this embodiment, the second terminal can send the first message to the core network entity, and further, under control of the core network entity, an association relationship between the first terminal and the second terminal can be implemented. Therefore, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

Figure 15:
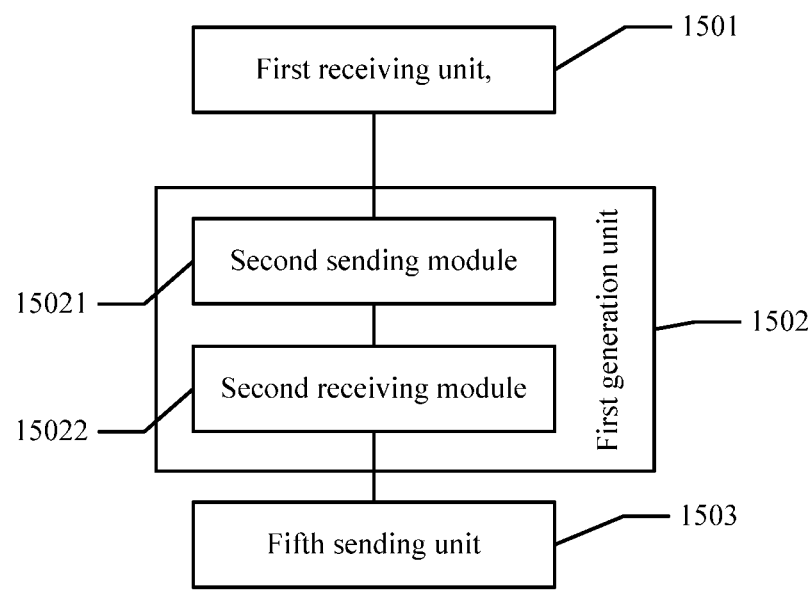
FIG. 15 is another schematic structural diagram of a core network entity according to an embodiment of the present invention.

With reference to an embodiment shown in FIG. 15, the following describes a specific structure of the core network entity if the first message is sent by the second terminal, and the core network entity shown in this embodiment is used to implement the embodiment shown in FIG. 7 or FIG. 8.

A first receiving unit 1501 is configured to receive the first message sent by the second terminal, where the first message includes an identity of the first terminal.

The first receiving unit 1501 is further configured to receive the first message sent by the second terminal, where the first message includes the identity of the first terminal.

A first generation unit 1502 is configured to: if the first generation unit determines that the identity of the first terminal included in the first message is included in a third list or that a converted identity of the first terminal is included in a third list, determine, by the first generation unit, that the first terminal is allowed to associate with the second terminal, where the first generation unit includes the third list, and the third list includes an identity of one or more first terminals allowed to associate with the second terminal.

The first generation unit 1502 specifically includes a second sending module 15021, configured to send a third message to the second terminal, where the third message is used to request the second terminal to determine whether the first terminal is allowed to associate with the second terminal. The first generation unit 1502 also includes a second receiving module 15022, configured to receive a fourth message returned by the second terminal, where the fourth message includes a determining result of the second terminal, and the second receiving module determines, according to the determining result, whether the first terminal is allowed to associate with the second terminal.

A fifth sending unit 1503 is configured to send the second message to the second terminal, where the second message includes indication information used to indicate that the first terminal is allowed to associate with the second terminal, so that the second terminal establishes an association with the first terminal according to the indication information.

In this embodiment, the fifth sending unit 1503 configured to establish the association between the first terminal and the second terminal is an example, and is not limited. For example, the unit configured to establish the association between the first terminal and the second terminal may also be a sixth sending unit, configured to send the second message to the first terminal, where the second message includes indication information used to indicate that the first terminal is allowed to associate with the second terminal, and a target key, where the target key is a key on an air interface of a direct channel between the first terminal and the second terminal, so that the second terminal sends the target key to the first terminal and that the first terminal establishes the association with the second terminal according to the indication information and the target key.

Figure 16:
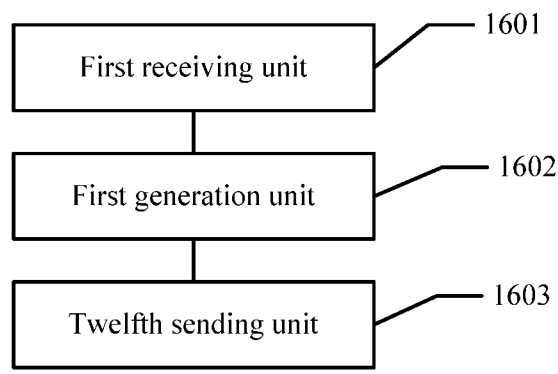
FIG. 16 is another schematic structural diagram of a core network entity according to an embodiment of the present invention.

With reference to FIG. 16, the following describes a specific structure of the core network entity when the second terminal determines whether the second terminal can associate with the first terminal.

Figure 9:
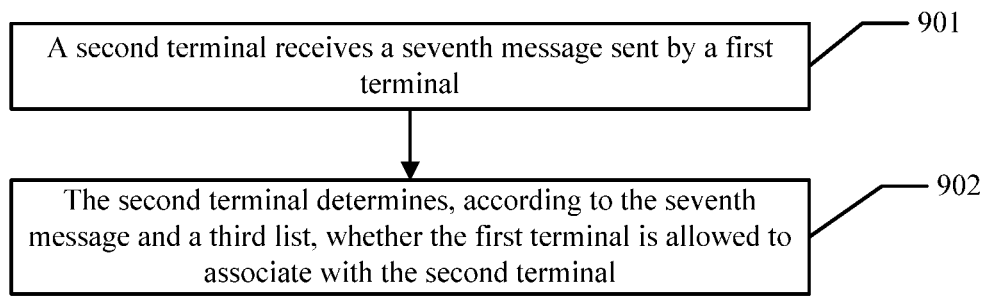
FIG. 9 is a flowchart of steps in another embodiment of a device association method according to an embodiment of the present invention.

The core network entity shown in this embodiment is used to implement the embodiment shown in FIG. 9.

The core network entity includes a first receiving unit 1601, a first generation unit 1602, and a twelfth sending unit 1603.

The first receiving unit 1601 is configured to receive a first message.

The first receiving unit 1601 is further configured to receive the first message sent by the second terminal, where the first message is used to indicate the second terminal allowed to establish an association with the first terminal.

The first generation unit 1602 is configured to generate a second message when it is determined, according to the first message, that the first terminal is allowed to associate with the second terminal, where the second message is used to establish the association between the first terminal and the second terminal.

The first generation unit 1602 is further configured to generate the second message including a target key, where the target key is a key on an air interface of a direct channel between the first terminal and the second terminal.

The twelfth sending unit 1603 is configured to send the second message to the second terminal, so that the second terminal forwards the second message to the first terminal.

Optionally, when the core network entity shown in this embodiment is used to implement the embodiment shown in FIG. 10, the core network entity further includes a thirteenth sending unit, configured to send a third list to the second terminal, where the third list includes an identity of one or more first terminals allowed to associate with the second terminal, so that when the second terminal determines that an identity of the first terminal is included in the third list or that a converted identity of the first terminal is included in the third list, the second terminal determines that the first terminal is allowed to associate with the second terminal.

Figure 17:
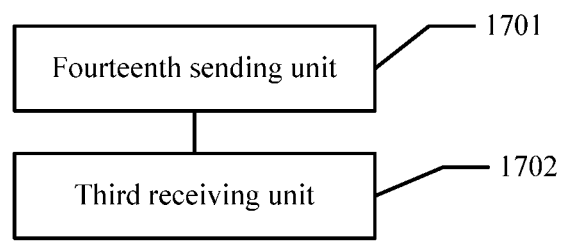
FIG. 17 is a schematic structural diagram of a first terminal according to an embodiment of the present invention.

With reference to FIG. 17, the following describes a structure of a first terminal used to implement the embodiment shown in FIG. 2.

The first terminal includes a fourteenth sending unit 1701, configured to send a first message to a core network entity, so that the core network entity generates a second message when the core network entity determines, according to the first message, that the first terminal is allowed to associate with a second terminal. The first terminal also includes a third receiving unit 1702, configured to receive the second message, where the second message is used to establish an association between the first terminal and the second terminal, so that the first terminal can connect to a network by using the second terminal.

Figure 18:
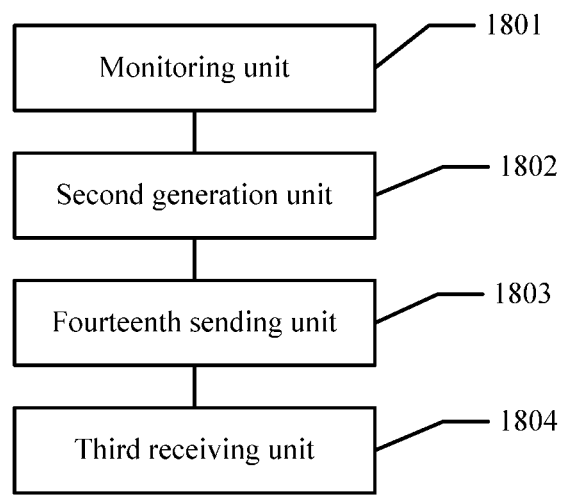
FIG. 18 is another schematic structural diagram of a first terminal according to an embodiment of the present invention.

With reference to FIG. 18, the following describes a specific structure of a first terminal that can implement the embodiment shown in FIG. 3, FIG. 4, FIG. 5, or FIG. 6.

A monitoring unit 1801 is configured to perform monitoring to obtain an identity of one or more target second terminals, where the target second terminal is a terminal that is monitored by the monitoring unit and whose signal strength is greater than a preset value.

A second generation unit 1802 is configured to generate the first message, where the first message includes a first list, and the first list includes the identity of the one or more target second terminals monitored by the monitoring unit, so that the core network entity determines, according to the first list, the second terminal allowed to associate with the first terminal.

A fourteenth sending unit 1803 is configured to send the first message to the second terminal, so that the second terminal forwards the first message to the core network entity, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

The fourteenth sending unit 1803 is further configured to send the first message to the second terminal, so that the second terminal forwards the first message to the core network entity, where the first message includes an identity of the first terminal, so that the core network entity sends a third message to the second terminal, where the third message is used to request the second terminal to determine whether the first terminal is allowed to associate, and the core network entity receives a fourth message returned by the second terminal, where the fourth message includes a determining result of the second terminal, and the core network entity determines, according to the determining result, whether the first terminal is allowed to associate with the second terminal.

A third receiving unit 1804 is configured to receive the second message sent by the second terminal, where the second message is a message sent by the core network entity to the first terminal by using the second terminal, the second message includes indication information used to indicate that the first terminal is allowed to associate with the second terminal, the first message is further used to trigger the core network entity to send a sixth message to the second terminal, and the sixth message includes the indication information used to indicate that the first terminal is allowed to associate with the second terminal, so that the first terminal and the second terminal establish an association according to the second message and the sixth message.

The third receiving unit 1804 is further configured to receive the second message sent by the second terminal, where the second message is a message sent by the core network entity to the first terminal by using the second terminal, the second message includes indication information used to indicate that the first terminal is allowed to associate with the second terminal, and a target key, the first message is further used to trigger the core network entity to send a sixth message to the second terminal, the sixth message includes the indication information used to indicate that the first terminal is allowed to associate with the second terminal, and the target key, and the target key is a key on an air interface of a direct channel between the first terminal and the second terminal, so that the first terminal and the second terminal establish an association according to the second message and the sixth message.

The following describes a structure of a first terminal used to implement a device association method.

The first terminal includes a fifteenth sending unit, configured to send a first message to a core network entity, so that the core network entity generates a second message when the core network entity determines, according to the first message, that a first terminal is allowed to associate with the second terminal, where the second message is used to establish an association between the first terminal and the second terminal, so that the first terminal can connect to a network by using the second terminal.

Figure 19:
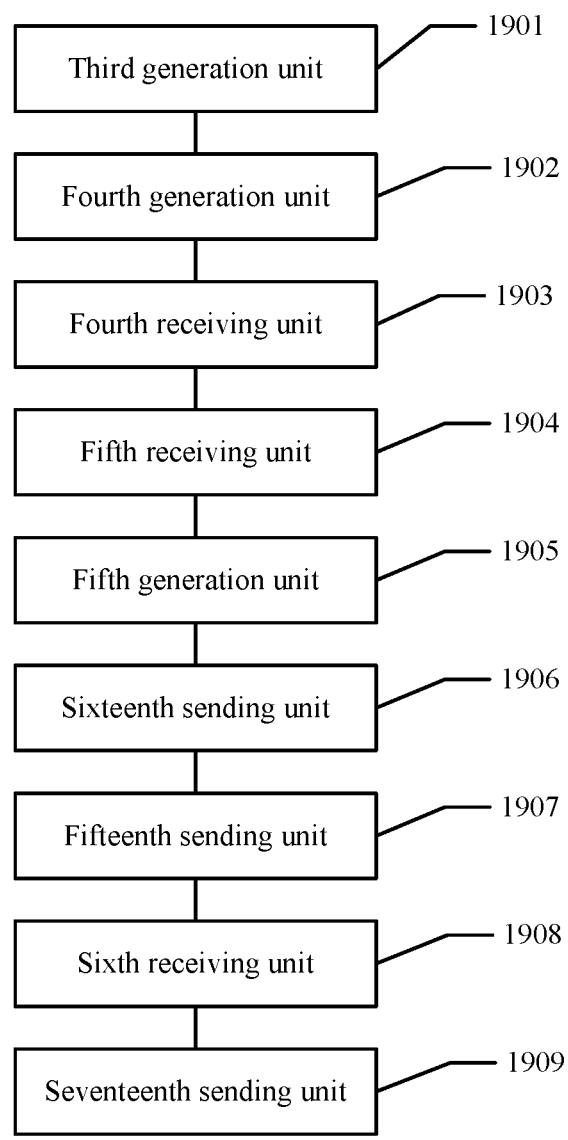
FIG. 19 is a schematic structural diagram of a second terminal according to an embodiment of the present invention.

With reference to FIG. 19, the following describes in detail a specific structure of a second terminal used to implement the device association method in the embodiment shown in FIG. 7 or FIG. 8.

The second terminal includes a third generation unit 1901, configured to generate the first message, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal. The second terminal also includes a fourth generation unit 1902, configured to generate the first message, where the first message includes an identity of the first terminal, the first message is used to trigger the core network entity to send a third message to the second terminal, and the third message is used to request the second terminal to determine whether the first terminal is allowed to associate with the second terminal. The second terminal further includes a fourth receiving unit 1903, configured to receive the third message. The second terminal also includes a fifth receiving unit 1904, configured to receive, according to the third message, an operation instruction that is entered by a user and used to instruct whether to allow the first terminal to associate with the second terminal. The second terminal further includes a fifth generation unit 1905, configured to generate a determining result according to the operation instruction entered by the user, where the determining result is used to indicate to the user whether the first terminal is allowed to associate with the second terminal. The second terminal further still includes a sixteenth sending unit 1906, configured to send a fourth message to the core network entity, where the fourth message includes the determining result. The second terminal also includes a fifteenth sending unit 1907, configured to send the first message to the core network entity, so that the core network entity generates a second message when the core network entity determines, according to the first message, that the first terminal is allowed to associate with the second terminal, where the second message is used to establish an association between the first terminal and the second terminal. The second terminal further includes a sixth receiving unit 1908, configured to receive the second message sent by the core network entity, where the second message includes indication information used to indicate that the first terminal is allowed to associate with the second terminal. The second terminal also includes a seventeenth sending unit 1909, configured to send the second message to the first terminal, so that the first terminal establishes the association with the second terminal according to the indication information.

In this embodiment, the sixth receiving unit 1908 and the seventeenth sending unit 1909 configured to establish the association between the first terminal and the second terminal are an example, and are not limited. For example, the units configured to establish the association between the first terminal and the second terminal may also be a seventh receiving unit, configured to receive the second message sent by the core network entity, where the second message includes indication information used to indicate that the first terminal is allowed to associate with the second terminal, and a target key, and the target key is a key on an air interface of a direct channel between the first terminal and the second terminal; and an eighteenth sending unit, configured to send the target key to the first terminal, so that the first terminal establishes the association with the second terminal according to the indication information and the target key.

Figure 20:
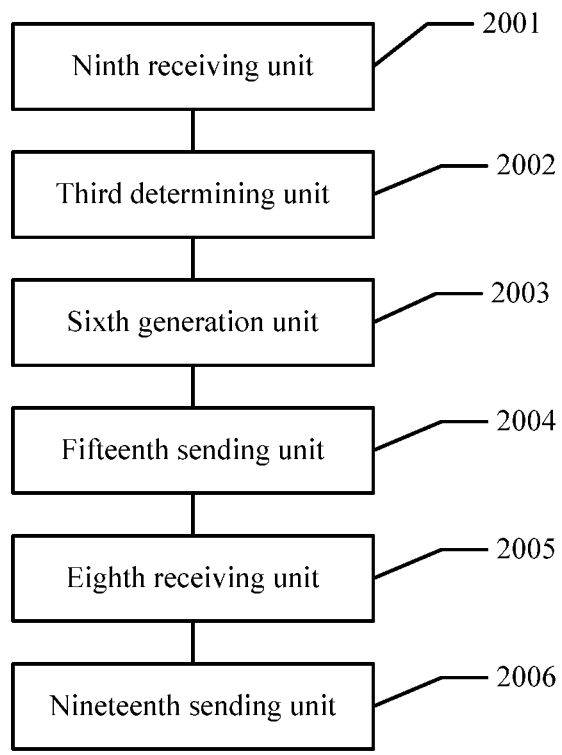
FIG. 20 is another schematic structural diagram of a second terminal according to an embodiment of the present invention.

With reference to FIG. 20, the following describes in detail a specific structure of a second terminal used to implement the device association method in the embodiment shown in FIG. 10.

The second terminal includes a ninth receiving unit 2001, configured to receive a third list sent by the core network entity, where the third list includes an identity of one or more first terminals allowed to associate with the second terminal. The second terminal also includes a third determining unit 2002, configured to, when determining that an identity of the first terminal is included in the third list or that a converted identity of the first terminal is included in the third list, determine that the first terminal is allowed to associate with the second terminal. The second terminal further includes a sixth generation unit 2003, configured to generate the first message, where the first message is used to indicate the second terminal allowed to establish an association with the first terminal. The second terminal also includes a fifteenth sending unit 2004, configured to send the first message to the core network entity, so that the core network entity generates a second message when the core network entity determines, according to the first message, that the first terminal is allowed to associate with the second terminal, where the second message is used to establish the association between the first terminal and the second terminal. The second terminal further includes an eighth receiving unit 2005, configured to receive the second message that includes a target key and is sent by the core network entity, where the target key is a key on an air interface of a direct channel between the first terminal and the second terminal. The second terminal further still includes a nineteenth sending unit 2006, configured to forward the second message to the first terminal.

Figure 21:
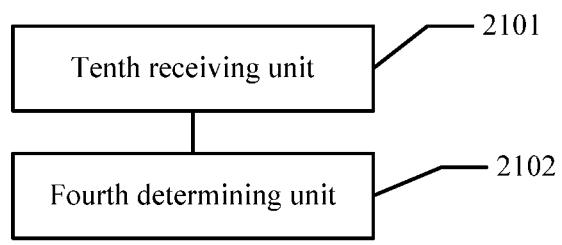
FIG. 21 is another schematic structural diagram of a second terminal according to an embodiment of the present invention.

With reference to FIG. 21, the following describes in detail a specific structure of a second terminal used to implement the device association method in the embodiment shown in FIG. 9.

The second terminal includes a tenth receiving unit 2101, configured to receive a seventh message sent by a first terminal. The second terminal also includes a fourth determining unit 2102, configured to determine, according to the seventh message and a third list, whether the first terminal is allowed to associate with the second terminal, where the third list includes an identity of one or more first terminals allowed to associate with the second terminal.

Figure 22:
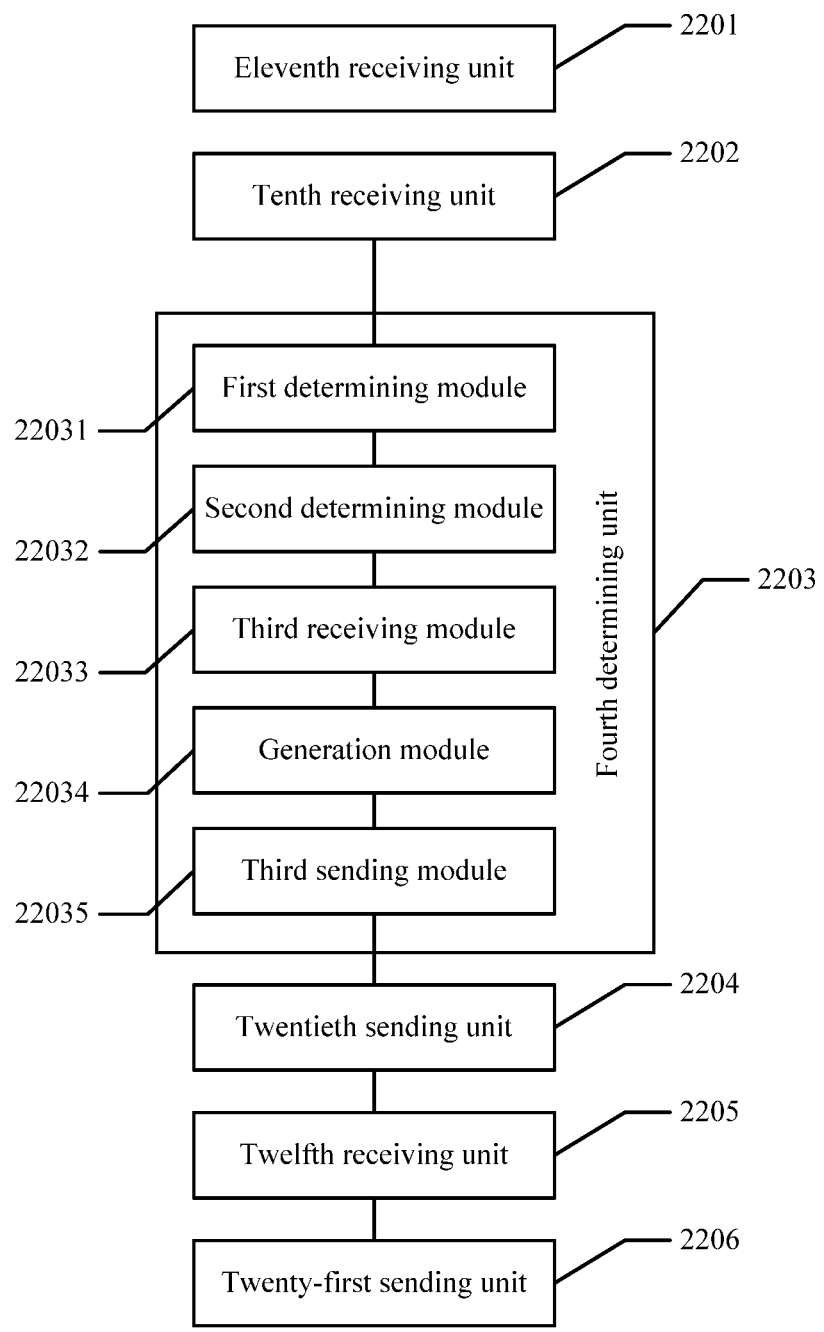
FIG. 22 is another schematic structural diagram of a second terminal according to an embodiment of the present invention.

With reference to FIG. 22, the following describes in detail a specific structure of a second terminal used to implement the device association method in the embodiment shown in FIG. 10.

An eleventh receiving unit 2201 is configured to receive the third list sent by the core network entity.

Optionally, the eleventh receiving unit 2201 may either not be disposed in the second terminal, but the third list is stored in a storage unit of the second terminal.

A tenth receiving unit 2202 is configured to receive a seventh message sent by a first terminal, where the seventh message includes an identity of the first terminal.

A fourth determining unit 2203 is configured to determine, according to the seventh message and the third list, whether the first terminal is allowed to associate with the second terminal, where the third list includes an identity of one or more first terminals allowed to associate with the second terminal.

Specifically, the fourth determining unit 2203 includes a first determining module 22031, configured to determine whether the identity of the first terminal included in the seventh message is included in the third list or whether a converted identity of the first terminal is included in the third list. The fourth determining unit 2203 also includes a second determining module 22032, configured to: if the first determining module determines that the identity of the first terminal included in the seventh message is included in the third list or that the converted identity of the first terminal is included in the third list, determine that the first terminal is allowed to associate with the second terminal. The fourth determining unit 2203 further includes a third receiving module 22033, configured to, if the first determining module determines that the identity of the first terminal included in the seventh message is not included in the third list or that the converted identity of the first terminal is not included in the third list, receive an operation instruction that is entered by a user and used to instruct whether to allow the first terminal to associate with the second terminal. The fourth determining unit 2203 also includes a generation module 22034, configured to generate a determining result according to the operation instruction entered by the user, where the determining result is used to indicate to the user whether the first terminal is allowed to associate with the second terminal. The fourth determining unit 2203 further includes a third sending module 22035, configured to send a fourth message to the core network entity, where the fourth message includes the determining result.

A twentieth sending unit 2204 is configured to send a first message to the core network entity when the second terminal determines that the first terminal associates with the second terminal.

A twelfth receiving unit 2205 is configured to receive a second message that includes a target key and is sent by the core network entity, where the second message is used to establish an association between the first terminal and the second terminal, and the target key is a key on an air interface of a direct channel between the first terminal and the second terminal.

A twenty-first sending unit 2206 is configured to forward the second message to the first terminal, so that the first terminal establishes the association with the second terminal.

The present invention further provides a communications system used to implement a device association. The communications system can effectively avoid complexity in manually associating a first terminal with a second terminal by a user, and can effectively reduce power consumption of the first terminal.

The communications system includes the core network entity shown in any one of FIG. 11 to FIG. 16, the first terminal shown in FIG. 17 or FIG. 18, and the second terminal shown in any one of FIG. 19 to FIG. 22.

In the embodiments shown in FIG. 11 to FIG. 16, a specific structure of a core network entity is described from a perspective of functional modules. The following describes a specific structure of a core network entity from a perspective of hardware with reference to an embodiment shown in FIG. 23.

Figure 23:
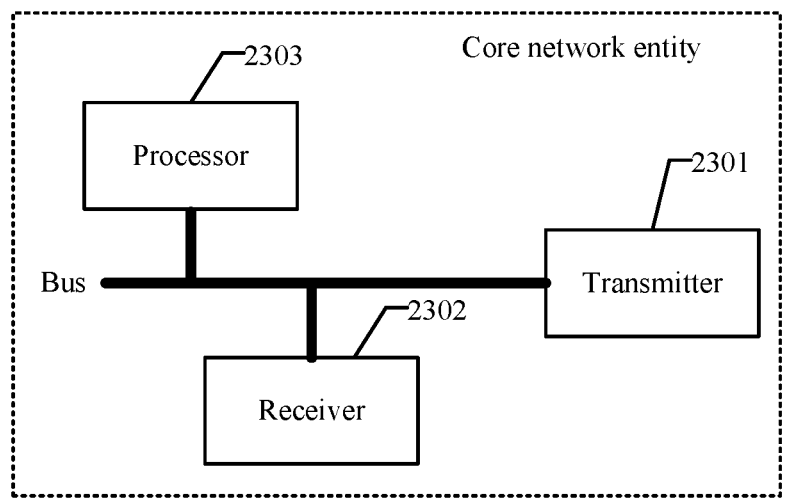
FIG. 23 is another schematic structural diagram of a core network entity according to an embodiment of the present invention.

As shown in FIG. 23, the core network entity includes a transmitter 2301, a receiver 2302, and a processor 2303. A quantity of processors 2303 may be one or more, and one is used as an example for description in this embodiment.

In addition, the transmitter 2301, the receiver 2302, and the processor 2303 are connected by a bus, or certainly may be connected in other manners. A specific connection manner is not limited in this embodiment.

A quantity of components of the core network entity that this embodiment of the present invention relates to may be greater than or less than that shown in FIG. 23. Two or more components may be combined, or different components may be configured or disposed, and each component may be implemented in hardware that includes one or more signal processing and/or dedicated integrated circuits, or in software, or in a combination of hardware and software.

In this embodiment, the core network entity is not limited, so long as the core network entity can communicate with the first terminal and the second terminal and can implement a certain control function. For example, in a fourth-generation mobile communications system environment, the core network entity may be a MME, but in a third-generation mobile communications system environment, the core network entity may be a SGSN.

The receiver 2302 is configured to receive a first message.

In this embodiment, a device that sends the first message is not limited, so long as after the receiver 2302 receives the first message, whether a first terminal is allowed to establish an association relationship with a second terminal is determined.

The processor 2303 is configured to generate a second message when determining, according to the first message, that the first terminal is allowed to associate with the second terminal, where the second message is used to establish the association between the first terminal and the second terminal, so that the first terminal can connect to a network by using the second terminal.

Apparently, under control of the core network entity, an association relationship between the first terminal and the second terminal can be implemented. Therefore, the first terminal having limited power, a limited antenna, and the like can perform data communication with the core network entity by using the second terminal, power consumption of the first terminal is reduced effectively, and efficiency of data transmission between the first terminal and the core network entity can be improved effectively.

Optionally, the receiver 2302 is configured to receive the first message sent by the first terminal, where the first message includes a first list, the first list includes an identity of one or more target second terminals monitored by the first terminal, and the target second terminal is a terminal that is monitored by the first terminal and whose signal strength is greater than a preset value. The processor 2303 is further configured to determine, according to the first list, the second terminal allowed to associate with the first terminal.

Optionally, the processor 2303 is further configured to: if the processor 2303 determines that an intersection exists between the first list and a second list, select, by the processor 2303, the second terminal from the intersection, where the processor 2303 includes the second list, and the second list includes an identity of one or more second terminals allowed to associate with the first terminal.

Optionally, the processor 2303 is further configured to select a target second terminal having greatest signal strength from the intersection as the second terminal, where the first list includes the identity of the one or more target second terminals and corresponding signal strength of each target second terminal.

Optionally, the first list includes the identity of the one or more target second terminals and corresponding signal strength of each target second terminal, and the processor 2303 is further configured to select a target second terminal having greatest signal strength from the first list as the second terminal. The transmitter 2301 is further configured to send a third message to the second terminal, where the third message is used to request the second terminal to determine whether the first terminal is allowed to associate with the second terminal. The receiver 2302 is further configured to receive a fourth message returned by the second terminal, where the fourth message includes a determining result of the second terminal. The processor 2303 is further configured to determine, according to the determining result, whether the first terminal is allowed to associate with the second terminal.

Optionally, the transmitter 2301 is further configured to send the second message to the first terminal, where the second message includes an identity of the second terminal. The transmitter 2301 is further configured to send a fifth message to the second terminal, where the fifth message includes an identity of the first terminal, so that the first terminal and the second terminal establish the association according to the second message and the fifth message.

Optionally, the transmitter 2301 is further configured to send the second message to the first terminal, where the second message includes an identity of the second terminal and a target key. The transmitter 2301 is further configured to send a fifth message to the second terminal, where the fifth message includes an identity of the first terminal and the target key, and the target key is a key on an air interface of a direct channel between the first terminal and the second terminal, so that the first terminal and the second terminal establish the association according to the second message and the fifth message.

Optionally, the receiver 2302 is further configured to receive the first message sent by the second terminal, where the first message includes an identity of the first terminal. The processor 2303 is further configured to: if the processor 2303 determines that the identity of the first terminal included in the first message is included in a third list or that a converted identity of the first terminal is included in a third list, determine, by the processor 2303, that the first terminal is allowed to associate with the second terminal, where the processor 2303 includes the third list, and the third list includes an identity of one or more first terminals allowed to associate with the second terminal.

Optionally, the receiver 2302 is configured to receive the first message sent by the second terminal, where the first message includes an identity of the first terminal. The transmitter 2301 is configured to send a third message to the second terminal, where the third message is used to request the second terminal to determine whether the first terminal is allowed to associate with the second terminal. The receiver 2302 is configured to receive a fourth message returned by the second terminal, where the fourth message includes a determining result of the second terminal. The processor 2303 is configured to determine, according to the determining result, whether the first terminal is allowed to associate with the second terminal.

Optionally, the transmitter 2301 is configured to send the second message to the second terminal, where the second message includes indication information used to indicate that the first terminal is allowed to associate with the second terminal, so that the second terminal establishes the association with the first terminal according to the indication information.

Optionally, the transmitter 2301 is configured to send the second message to the first terminal, where the second message includes indication information used to indicate that the first terminal is allowed to associate with the second terminal, and a target key, where the target key is a key on an air interface of a direct channel between the first terminal and the second terminal, so that the second terminal sends the target key to the first terminal and that the first terminal establishes the association with the second terminal according to the indication information and the target key.

Optionally, the receiver 2302 is configured to receive the first message sent by the first terminal by using the second terminal, where the first message includes an identity of the first terminal. The processor 2303 is configured to: if it is determined that the identity of the first terminal included in the first message is included in a third list or that a converted identity of the first terminal is included in a third list, determine that the first terminal is allowed to associate with the second terminal, where the processor 2303 includes the third list, and the third list includes an identity of one or more first terminals allowed to associate with the second terminal.

Optionally, the receiver 2302 is configured to receive the first message sent by the first terminal by using the second terminal, where the first message includes an identity of the first terminal. The transmitter 2301 is configured to send a third message to the second terminal, where the third message is used to request the second terminal to determine whether the first terminal is allowed to associate. The receiver 2302 is configured to receive a fourth message returned by the second terminal, where the fourth message includes a determining result of the second terminal, and the core network entity determines, according to the determining result, whether the first terminal is allowed to associate with the second terminal.

Optionally, the transmitter 2301 is configured to send the second message to the first terminal by using the second terminal, where the second message includes indication information used to indicate that the first terminal is allowed to associate with the second terminal. The transmitter 2301 is configured to send a sixth message to the second terminal, where the sixth message includes the indication information used to indicate that the first terminal is allowed to associate with the second terminal, so that the first terminal and the second terminal establish the association according to the second message and the sixth message.

Optionally, the transmitter 2301 is configured to send the second message to the first terminal by using the second terminal, where the second message includes indication information used to indicate that the first terminal is allowed to associate with the second terminal, and a target key. The transmitter 2301 is configured to send a sixth message to the second terminal, where the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

Optionally, the receiver 2302 is configured to receive the first message sent by the second terminal, where the first message is used to indicate the second terminal allowed to establish the association with the first terminal. The processor 2303 is configured to generate the second message including a target key, where the target key is a key on an air interface of a direct channel between the first terminal and the second terminal. The transmitter 2301 is configured to send the second message to the second terminal, so that the second terminal forwards the second message to the first terminal.

Optionally, the transmitter 2301 is configured to send a third list to the second terminal, where the third list includes an identity of one or more first terminals allowed to associate with the second terminal, so that when the second terminal determines that an identity of the first terminal is included in the third list or that a converted identity of the first terminal is included in the third list, the second terminal determines that the first terminal is allowed to associate with the second terminal.

In the embodiments shown in FIG. 17 and FIG. 18, a specific structure of a first terminal is described from a perspective of functional modules. The following describes a specific structure of a first terminal from a perspective of hardware with reference to an embodiment shown in FIG. 24.

Figure 24:
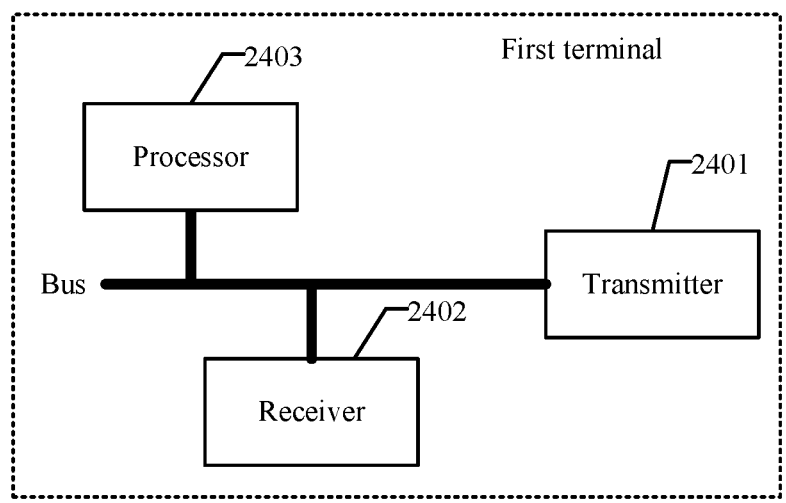
FIG. 24 is another schematic structural diagram of a first terminal according to an embodiment of the present invention.

As shown in FIG. 24, the first terminal includes a transmitter 2401, a receiver 2402, and a processor 2403. A quantity of processors 2403 may be one or more, and one is used as an example for description in this embodiment.

In addition, the transmitter 2401, the receiver 2402, and the processor 2403 are connected by a bus, or certainly may be connected in other manners. A specific connection manner is not limited in this embodiment.

A quantity of components of the first terminal that this embodiment of the present invention relates to may be greater than or less than that shown in FIG. 24. Two or more components may be combined, or different components may be configured or disposed, and each component may be implemented in hardware that includes one or more signal processing and/or dedicated integrated circuits, or in software, or in a combination of hardware and software.

The transmitter 2401 is configured to send a first message to a core network entity, so that the core network entity generates a second message when the core network entity determines, according to the first message, that the first terminal is allowed to associate with a second terminal.

The receiver 2402 is configured to receive the second message, where the second message is used to establish an association between the first terminal and the second terminal, so that the first terminal can connect to a network by using the second terminal.

Optionally, the processor 2403 is configured to perform monitoring to obtain an identity of one or more target second terminals, where the target second terminal is a terminal that is monitored by the first terminal and whose signal strength is greater than a preset value, and generate the first message, where the first message includes a first list, and the first list includes the identity of the one or more target second terminals monitored by the first terminal, so that the core network entity determines, according to the first list, the second terminal allowed to associate with the first terminal. The first list includes the identity of the one or more target second terminals and corresponding signal strength of each target second terminal.

Optionally, the transmitter 2401 is configured to send the first message to the second terminal, so that the second terminal forwards the first message to the core network entity, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

Optionally, the transmitter 2401 is configured to send the first message to the second terminal, so that the second terminal forwards the first message to the core network entity, where the first message includes an identity of the first terminal, so that the core network entity sends a third message to the second terminal, where the third message is used to request the second terminal to determine whether the first terminal is allowed to associate, and the core network entity receives a fourth message returned by the second terminal, where the fourth message includes a determining result of the second terminal, and the core network entity determines, according to the determining result, whether the first terminal is allowed to associate with the second terminal.

Optionally, the receiver 2402 is configured to receive the second message sent by the second terminal, where the second message is a message sent by the core network entity to the first terminal by using the second terminal, the second message includes indication information used to indicate that the first terminal is allowed to associate with the second terminal, the first message is further used to trigger the core network entity to send a sixth message to the second terminal, and the sixth message includes the indication information used to indicate that the first terminal is allowed to associate with the second terminal, so that the first terminal and the second terminal establish the association according to the second message and the sixth message.

Optionally, the receiver 2402 is configured to receive the second message sent by the second terminal, where the second message is a message sent by the core network entity to the first terminal by using the second terminal, the second message includes indication information used to indicate that the first terminal is allowed to associate with the second terminal, and a target key, the first message is further used to trigger the core network entity to send a sixth message to the second terminal, the sixth message includes the indication information used to indicate that the first terminal is allowed to associate with the second terminal, and the target key, and the target key is a key on an air interface of a direct channel between the first terminal and the second terminal, so that the first terminal and the second terminal establish the association according to the second message and the sixth message.

In the embodiments shown in FIG. 19 and FIG. 20, a specific structure of a second terminal is described from a perspective of functional modules. The following describes a specific structure of a second terminal from a perspective of hardware with reference to an embodiment shown in FIG. 25.

Figure 25:
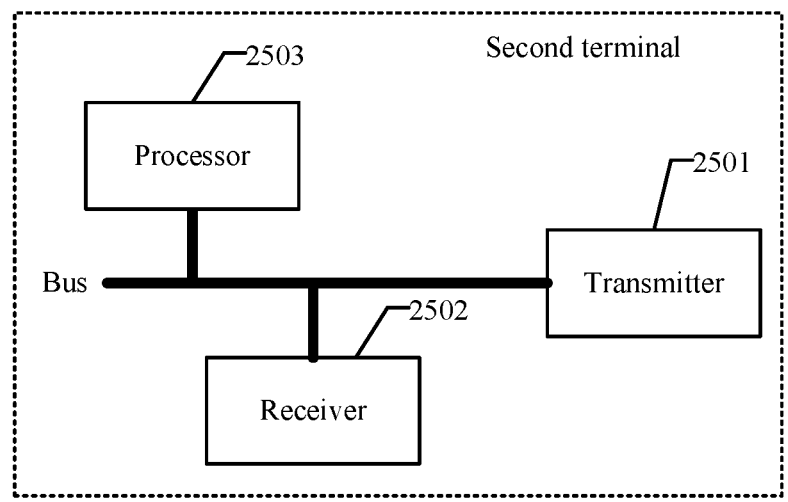
FIG. 25 is another schematic structural diagram of a second terminal according to an embodiment of the present invention.

As shown in FIG. 25, the second terminal includes a transmitter 2501, a receiver 2502, and a processor 2503. A quantity of processors 2503 may be one or more, and one is used as an example for description in this embodiment.

In addition, the transmitter 2501, the receiver 2502, and the processor 2503 are connected by a bus, or certainly may be connected in other manners. A specific connection manner is not limited in this embodiment.

A quantity of components of the second terminal that this embodiment of the present invention relates to may be greater than or less than that shown in FIG. 25. Two or more components may be combined, or different components may be configured or disposed, and each component may be implemented in hardware that includes one or more signal processing and/or dedicated integrated circuits, or in software, or in a combination of hardware and software.

The transmitter 2501 is configured to send a first message to a core network entity, so that the core network entity generates a second message when the core network entity determines, according to the first message, that a first terminal is allowed to associate with the second terminal, where the second message is used to establish an association between the first terminal and the second terminal, so that the first terminal can connect to a network by using the second terminal.

Optionally, the processor 2503 is configured to generate the first message, where the first message includes an identity of the first terminal, so that if the core network entity determines that the identity of the first terminal included in the first message satisfies a preset requirement, the core network entity determines that the first terminal is allowed to associate with the second terminal, where the preset requirement is that the identity of the first terminal is included in a third list or that a converted identity of the first terminal is included in a third list, the core network entity includes the third list, and the third list includes an identity of one or more first terminals allowed to associate with the second terminal.

Optionally, the processor 2503 is configured to generate the first message, where the first message includes an identity of the first terminal, the first message is used to trigger the core network entity to send a third message to the second terminal, and the third message is used to request the second terminal to determine whether the first terminal is allowed to associate with the second terminal. The receiver 2502 is configured to receive the third message. The receiver 2502 is configured to receive, according to the third message, an operation instruction that is entered by a user and used to instruct whether to allow the first terminal to associate with the second terminal. The processor 2503 is configured to generate a determining result according to the operation instruction entered by the user, where the determining result is used to indicate to the user whether the first terminal is allowed to associate with the second terminal. The transmitter 2501 is configured to send a fourth message to the core network entity, where the fourth message includes the determining result.

Optionally, the receiver 2502 is configured to receive the second message sent by the core network entity, where the second message includes indication information used to indicate that the first terminal is allowed to associate with the second terminal. The transmitter 2501 is configured to send the second message to the first terminal, so that the first terminal establishes the association with the second terminal according to the indication information.

Optionally, the receiver 2502 is configured to receive the second message sent by the core network entity, where the second message includes indication information used to indicate that the first terminal is allowed to associate with the second terminal, and a target key, and the target key is a key on an air interface of a direct channel between the first terminal and the second terminal. The transmitter 2501 is configured to send the target key to the first terminal, so that the first terminal establishes the association with the second terminal according to the indication information and the target key.

Optionally, the processor 2503 is configured to generate the first message, where the first message is used to indicate the second terminal allowed to establish the association with the first terminal. The receiver 2502 is configured to receive the second message that includes a target key and is sent by the core network entity, where the target key is a key on an air interface of a direct channel between the first terminal and the second terminal. The transmitter 2501 is configured to forward the second message to the first terminal.

Optionally, the receiver 2502 is configured to receive a third list sent by the core network entity, where the third list includes an identity of one or more first terminals allowed to associate with the second terminal. The processor 2503 is configured to: when determining that an identity of the first terminal is included in the third list or that a converted identity of the first terminal is included in the third list, determine that the first terminal is allowed to associate with the second terminal.

In the embodiments shown in FIG. 21 and FIG. 22, a specific structure of a second terminal is described from a perspective of functional modules. The following describes a specific structure of a second terminal from a perspective of hardware with reference to an embodiment shown in FIG. 26.

Figure 26:
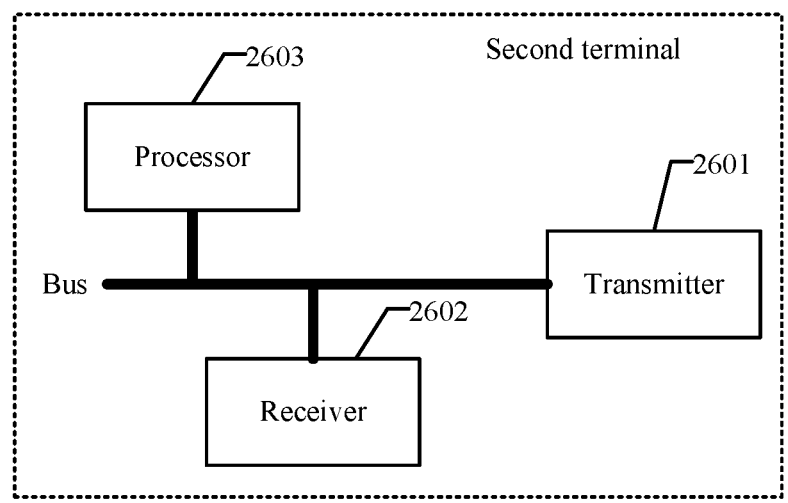
FIG. 26 is another schematic structural diagram of a second terminal according to an embodiment of the present invention.

As shown in FIG. 26, the second terminal includes a transmitter 2601, a receiver 2602, and a processor 2603. A quantity of processors 2603 may be one or more, and one is used as an example for description in this embodiment.

In addition, the transmitter 2601, the receiver 2602, and the processor 2603 are connected by a bus, or certainly may be connected in other manners. A specific connection manner is not limited in this embodiment.

A quantity of components of the second terminal that this embodiment of the present invention relates to may be greater than or less than that shown in FIG. 26. Two or more components may be combined, or different components may be configured or disposed, and each component may be implemented in hardware that includes one or more signal processing and/or dedicated integrated circuits, or in software, or in a combination of hardware and software.

The receiver 2602 is configured to receive a seventh message sent by a first terminal.

The processor 2603 is configured to determine, according to the seventh message and a third list, whether the first terminal is allowed to associate with the second terminal, where the third list includes an identity of one or more first terminals allowed to associate with the second terminal.

Optionally, the third list is pre-stored by the second terminal. Alternatively, the receiver 2602 is configured to receive the third list sent by the core network entity.

Optionally, the processor 2603 is configured to determine whether an identity of the first terminal included in the seventh message is included in the third list or whether a converted identity of the first terminal is included in the third list. The processor 2603 is configured to, if the processor 2603 determines that the identity of the first terminal included in the seventh message is included in the third list or that the converted identity of the first terminal is included in the third list, determine, by the processor 2603, that the first terminal is allowed to associate with the second terminal. The receiver 2602 is configured to, if the processor 2603 determines that the identity of the first terminal included in the seventh message is included in the third list or that the converted identity of the first terminal is included in the third list, receive, by the receiver 2602, an operation instruction that is entered by a user and used to instruct whether to allow the first terminal to associate with the second terminal. The processor 2603 is configured to generate a determining result according to the operation instruction entered by the user, where the determining result is used to indicate to the user whether the first terminal is allowed to associate with the second terminal. The transmitter 2601 is configured to send a fourth message to the core network entity, where the fourth message includes the determining result.

Optionally, the transmitter 2601 is configured to send a first message to the core network entity when the second terminal determines that the first terminal associates with the second terminal. The receiver 2602 is configured to receive a second message that includes a target key and is sent by the core network entity, where the second message is used to establish an association between the first terminal and the second terminal, and the target key is a key on an air interface of a direct channel between the first terminal and the second terminal. The transmitter 2601 is configured to forward the second message to the first terminal, so that the first terminal establishes the association with the second terminal.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method, comprising:
performing, by a first terminal, monitoring to obtain an identity of one or more target second terminals, wherein the one or more target second terminals are terminals that are monitored by the first terminal and that have a signal strength greater than a preset value, wherein the one or more target second terminals includes a second terminal; and
generating, by the first terminal, a first message, wherein the first message comprises a first list, and the first list comprises the identity of the one or more target second terminals monitored by the first terminal;
sending, by a first terminal, the first message to a core network entity, the first message including an identity of the first terminal, wherein the core network entity determines that the first terminal is allowed to associate with the second terminal based on the first message and generates a second message comprising information indicating that the first terminal is allowed to associate with a second terminal;
receiving, by the first terminal, the second message;
establishing, by the first terminal, an association between the first terminal and the second terminal based on the second message; and
connecting, by the first terminal, to a network using the second terminal.

2. The method according to claim 1,
wherein the core network entity determines, according to the first list, that the second terminal is allowed to associate with the first terminal.

3. The method according to claim 1, wherein the first list comprises the identity of the one or more target second terminals and a corresponding signal strength of each target second terminal of the one or more target second terminals.

4. The method according to claim 1, wherein an identity of the second terminal is used for broadcasting on a target air interface by the second terminal, or a globally unique temporary terminal identity (GUTI) of the second terminal, or a mobile station international integrated services digital network (ISDN) number (MSISDN) of the second terminal, or an international mobile equipment identity (IMEI) of the second terminal, and the target air interface is an air interface of a direct channel between the first terminal and the second terminal; and wherein the identity of the first terminal is an IMEI of the first terminal, or a MSISDN of the first terminal, or an ISDN of the first terminal, or a GUTI of the first terminal, or an internet protocol (IP) multimedia public identity (IMPU) of the first terminal.

5. The method according to claim 1, wherein sending the first message comprises:
sending, by the first terminal, the first message to the second terminal, wherein the second terminal forwards the first message to the core network entity, wherein the first message comprises an identity of the first terminal, wherein when the core network entity determines that the identity of the first terminal comprised in the first message satisfies a preset requirement, the core network entity determines that the first terminal is allowed to associate with the second terminal, wherein the preset requirement is that the identity of the first terminal is in a third list or that a converted identity of the first terminal is in the third list, wherein the core network entity stores the third list, and wherein the third list comprises identities of one or more terminals allowed to associate with the second terminal, and wherein the identities of the one or more terminals includes the identity of the first terminal or the converted identity of the first terminal.

6. The method according to claim 5, wherein receiving the second message comprises:
receiving, by the first terminal, the second message sent by the second terminal, wherein the second message is sent by the core network entity to the first terminal using the second terminal, the first message further triggers the core network entity to send a sixth message to the second terminal, and the sixth message comprises information indicating that the first terminal is allowed to associate with the second terminal, wherein the first terminal and the second terminal establish an association according to the second message and the sixth message.

7. The method according to claim 5, wherein receiving the second message comprises:
receiving, by the first terminal, the second message sent by the second terminal, wherein the second message is sent by the core network entity to the first terminal using the second terminal, the second message comprises a target key, the first message further triggers the core network entity to send a sixth message to the second terminal, the sixth message comprises the information indicating that the first terminal is allowed to associate with the second terminal and the target key, and the target key is a key on an air interface of a direct channel between the first terminal and the second terminal, wherein the first terminal and the second terminal establish an association according to the second message and the sixth message.

8. The method according to claim 1, wherein sending the first message comprises:
sending, by the first terminal, the first message to the second terminal, wherein the second terminal forwards the first message to the core network entity, wherein the first message comprises an identity of the first terminal, wherein the core network entity sends a third message to the second terminal, wherein the third message requests the second terminal to determine whether the first terminal is allowed to associate with the second terminal, and the core network entity receives a fourth message returned by the second terminal, wherein the fourth message comprises a determining result of the second terminal, and the core network entity determines, according to the determining result, that the first terminal is allowed to associate with the second terminal.

9. A method, comprising:
receiving, by a second terminal, a first message from a first terminal, the first message including an identity of the first terminal, the first message including a first list, the first list comprising an identity of one or more target second terminals monitored by the first terminal, the one or more target second terminals including the second terminal, the one or more target second terminals being included in the first list for having a signal strength greater than a preset value;
sending, by the second terminal, the first message to a core network entity, wherein the core network entity determines that the first terminal is allowed to associate with the second terminal based on the first message, and wherein the core network entity generates a second message comprising information indicating that the first terminal is allowed to associate with the second terminal; and
sending, by the second terminal, the second message to the first terminal, wherein the first terminal uses the second message to establish an association between the first terminal and the second terminal, wherein the first terminal connects to a network using the second terminal.

10. The method according to claim 9, wherein when the core network entity determines that the identity of the first terminal comprised in the first message satisfies a preset requirement, the core network entity determines that the first terminal is allowed to associate with the second terminal, wherein the preset requirement is that the identity of the first terminal is in a third list or that a converted identity of the first terminal is in the third list, wherein the core network entity stores the third list, and wherein the third list comprises identities of one or more terminals allowed to associate with the second terminal, and wherein the identities of the one or more terminals includes the identity of the first terminal or the converted identity of the first terminal.

11. The method according to claim 10, wherein the method further comprises:
receiving, by the second terminal, a sixth message from the core network entity, wherein the sixth message comprises information indicating that the first terminal is allowed to associate with the second terminal; and
using the sixth message to establish the association with the first terminal according.

12. The method according to claim 10, wherein the second message further comprises a target key, wherein the target key is a key on an air interface of a direct channel between the first terminal and the second terminal; and
sending, by the second terminal, the target key to the first terminal, wherein the first terminal establishes the association with the second terminal according to the information and the target key.

13. The method according to claim 9, wherein an identity of the second terminal is an identity used for broadcasting on a target air interface by the second terminal, or a globally unique temporary terminal identity (GUTI) of the second terminal, or a mobile station international integrated services digital network (ISDN) number (MSISDN) of the second terminal, or an international mobile equipment identity (IMEI) of the second terminal, and the target air interface is an air interface of a direct channel between the first terminal and the second terminal; and the identity of the first terminal is an IMEI of the first terminal, or a MSISDN of the first terminal, or an ISDN of the first terminal, or a GUTI of the first terminal, or an internet protocol (IP) multimedia public identity (IMPU) of the first terminal.

14. The method according to claim 9, wherein the first message triggers the core network entity to send a third message to the second terminal, wherein the method further comprises:
receiving, by the second terminal, the third message, the third message requesting the second terminal to determine whether the first terminal is allowed to associate with the second terminal;
receiving, by the second terminal according to the third message, an operation instruction that is entered by a user, wherein the operation instruction instructs whether to allow the first terminal to associate with the second terminal;
generating, by the second terminal, a determining result according to the operation instruction entered by the user, wherein the determining result indicates to the user that the first terminal is allowed to associate with the second terminal; and
sending, by the second terminal, a fourth message to the core network entity, wherein the fourth message comprises the determining result.

15. The method according to claim 9, wherein the method further comprises:
after sending the first message to a core network entity, receiving, by the second terminal, the second message that comprises a target key from the core network entity, wherein the target key is a key on an air interface of a direct channel between the first terminal and the second terminal.

16. The method according to claim 15, further comprising:
receiving, by the second terminal, a third list from the core network entity, wherein the third list comprises identities one or more terminals allowed to associate with the second terminal, wherein the identities of the one or more terminals includes the identity of the first terminal or a converted identity of the first terminal; and
when the second terminal determines that the identity of the first terminal or that the converted identity of the first terminal is in the third list, determining, by the second terminal, that the first terminal is allowed to associate with the second terminal.

17. The method of claim 9, wherein the first list comprises the identity of one or more target second terminals and a corresponding signal strength of each of the one or more target second terminals.

18. A method, comprising:
receiving, by a second terminal, a seventh message sent by a first terminal, the seventh message including an identity of the first terminal;
determining, by the second terminal according to the seventh message and a third list, that the first terminal is allowed to associate with the second terminal, wherein the third list comprises identities of one or more terminals allowed to associate with the second terminal, wherein the third list is pre-stored by the second terminal or wherein, before determining whether the first terminal is allowed to associate with the second terminal, the third list is received by the second terminal from a core network entity;
when the identity of the first terminal is in the third list or when a converted identity of the first terminal is in the third list, determining further that the first terminal is allowed to associate with the second terminal;
determining, by the second terminal, that the first terminal associates with the second terminal;
sending a first message to the core network entity indicating that the first terminal is allowed to associate with the second terminal;
receiving a second message from the core network entity including the identity of the first terminal; and
forwarding the second message to the first terminal, wherein the first terminal establishes the association with the second terminal, based on the second message.

19. The method according to claim 18, further comprising:
when the identity of the first terminal is not in the third list or when the converted identity of the first terminal is not in the third list, receiving, by the second terminal, an operation instruction that is entered by a user and used to instruct to allow the first terminal to associate with the second terminal;
generating, by the second terminal, a determining result according to the operation instruction entered by the user, wherein the determining result indicates to the user that the first terminal is allowed to associate with the second terminal; and
sending, by the second terminal, a fourth message to the core network entity, wherein the fourth message comprises the determining result.

20. The method according to claim 18, wherein the second message comprises a target key provided by the core network entity, wherein the target key is a key on an air interface of a direct channel between the first terminal and the second terminal.

* * * * *